United States Patent
Ishiguro et al.

(10) Patent No.: US 7,860,330 B2
(45) Date of Patent: Dec. 28, 2010

(54) IMAGE PROCESSING APPARATUS AND IMAGE PROCESSING METHOD FOR REMOVING A NOISE GENERATED BY SCANNING A FOREIGN OBJECT FROM IMAGE DATA OBTAINED BY SCANNING AN ORIGINAL DOCUMENT

(75) Inventors: Kazuhiro Ishiguro, Toyohashi (JP); Takayuki Nabeshima, Toyokawa (JP); Masaaki Saka, Okazaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1063 days.

(21) Appl. No.: 11/540,660

(22) Filed: Oct. 2, 2006

(65) Prior Publication Data

US 2007/0097443 A1 May 3, 2007

(30) Foreign Application Priority Data

Oct. 31, 2005 (JP) ............................. 2005-317821

(51) Int. Cl.
*G06K 9/40* (2006.01)

(52) U.S. Cl. ...................... 382/254; 382/274; 382/275; 358/275; 358/463

(58) Field of Classification Search ................ 382/260, 382/274, 275; 358/3.26, 3.27, 463
See application file for complete search history.

(56) References Cited

U.S. PATENT DOCUMENTS

| | | | | | |
|---|---|---|---|---|---|
| 5,956,468 | A * | 9/1999 | Ancin | ......................... | 358/1.9 |
| 6,282,326 | B1 * | 8/2001 | Lee et al. | ..................... | 382/289 |
| 6,331,038 | B1 * | 12/2001 | Boleda et al. | .................. | 347/9 |
| 6,655,784 | B2 * | 12/2003 | Kakutani | ..................... | 347/43 |
| 6,934,057 | B1 * | 8/2005 | Namizuka | .................. | 358/2.1 |
| 7,016,552 | B2 * | 3/2006 | Koyama | ..................... | 382/289 |
| 7,031,025 | B1 * | 4/2006 | He et al. | ..................... | 358/3.09 |
| 7,130,085 | B2 * | 10/2006 | Ohara et al. | ................ | 358/3.06 |
| 7,142,733 | B1 * | 11/2006 | Nakagawa | .................. | 382/310 |
| 7,196,822 | B2 * | 3/2007 | Hu | ............................. | 358/3.16 |
| 7,199,897 | B2 * | 4/2007 | Nomizu | ..................... | 358/1.18 |
| 2003/0090742 | A1 | 5/2003 | Fukuda et al. | | |

FOREIGN PATENT DOCUMENTS

| | | |
|---|---|---|
| JP | 6-164928 | 6/1994 |
| JP | 2003-101737 | 4/2003 |
| JP | 2003-198838 | 7/2003 |
| JP | 2005-094807 | 4/2005 |
| JP | 2005-117090 | 4/2005 |

OTHER PUBLICATIONS

Japanese Office Action, mailed on Jan. 15, 2008, directed to corresponding Japanese Patent Application No. 2005-317821. 6 pages.

* cited by examiner

*Primary Examiner*—Yosef Kassa
(74) *Attorney, Agent, or Firm*—Morrison & Foerster LLP

(57) ABSTRACT

In order to enhance the quality of image after removing a noise from image data obtained by scanning an original document, an MFP is provided with a scanning portion to obtain the image data by scanning the original document, a noise detection processing portion to detect a noise from the obtained image data, a dot region detecting portion to detect a region of dots from the obtained image data, and a copy correction processing portion to substitute a noise region with a substitution region that is located in the vicinity of the noise region and that is of the same size as the noise region if a region in the vicinity of the noise region including the noise detected by the noise detection processing portion is included in the region of dots detected by the dot region detecting portion.

22 Claims, 18 Drawing Sheets

F I G. 3
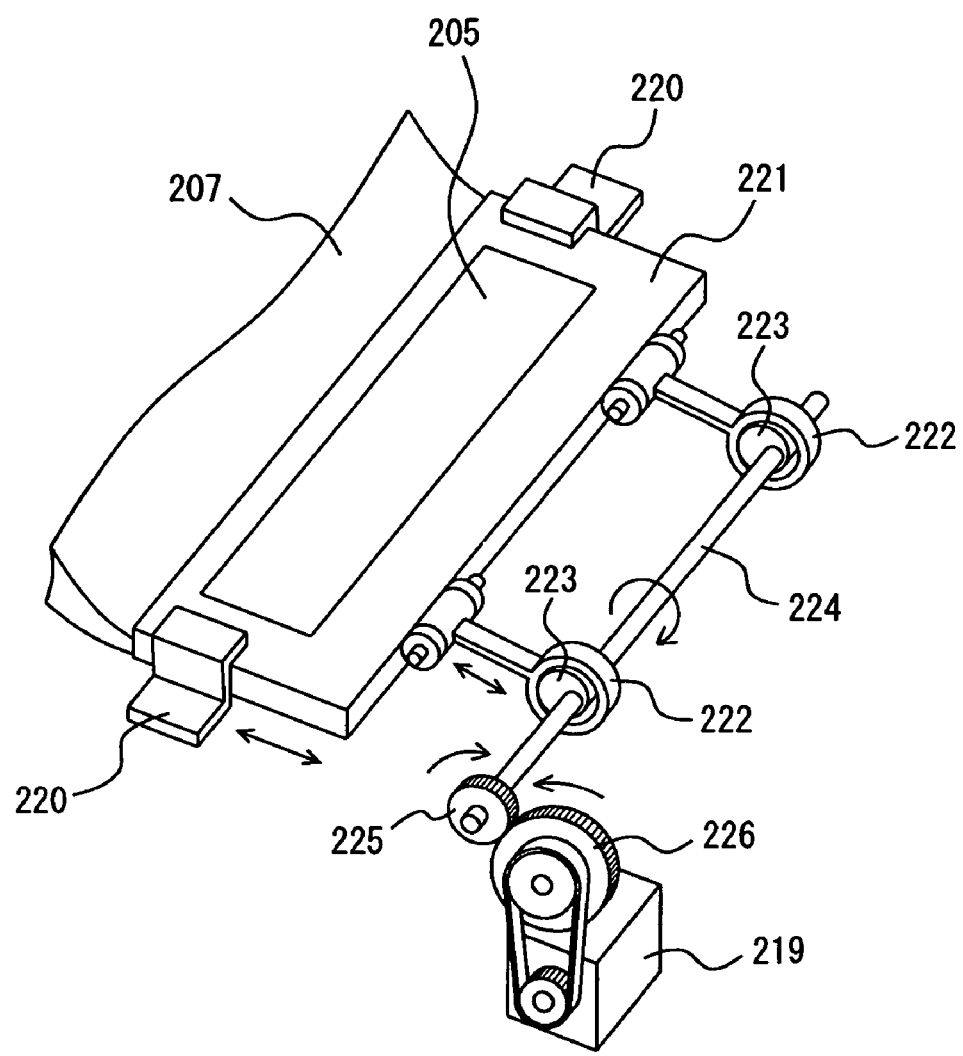

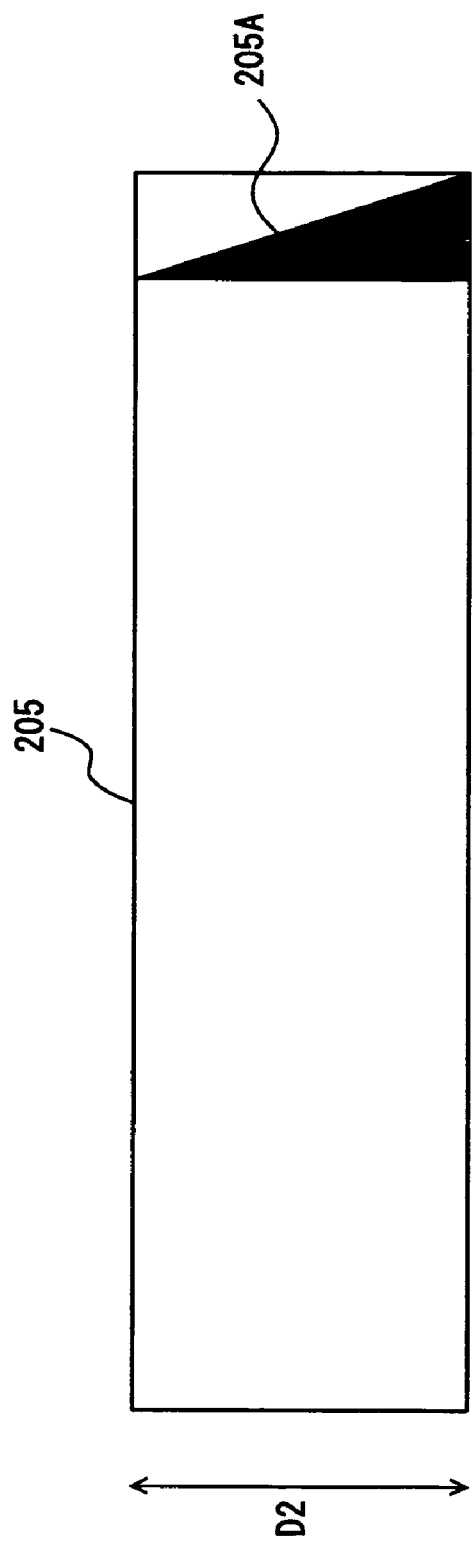

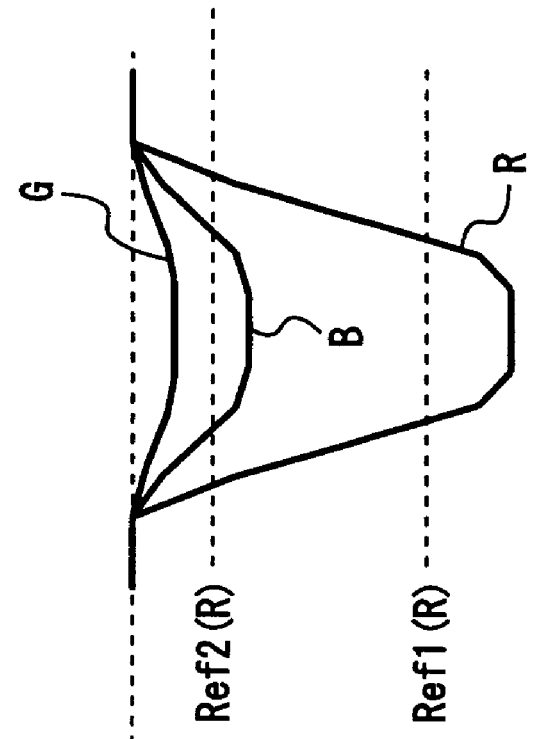
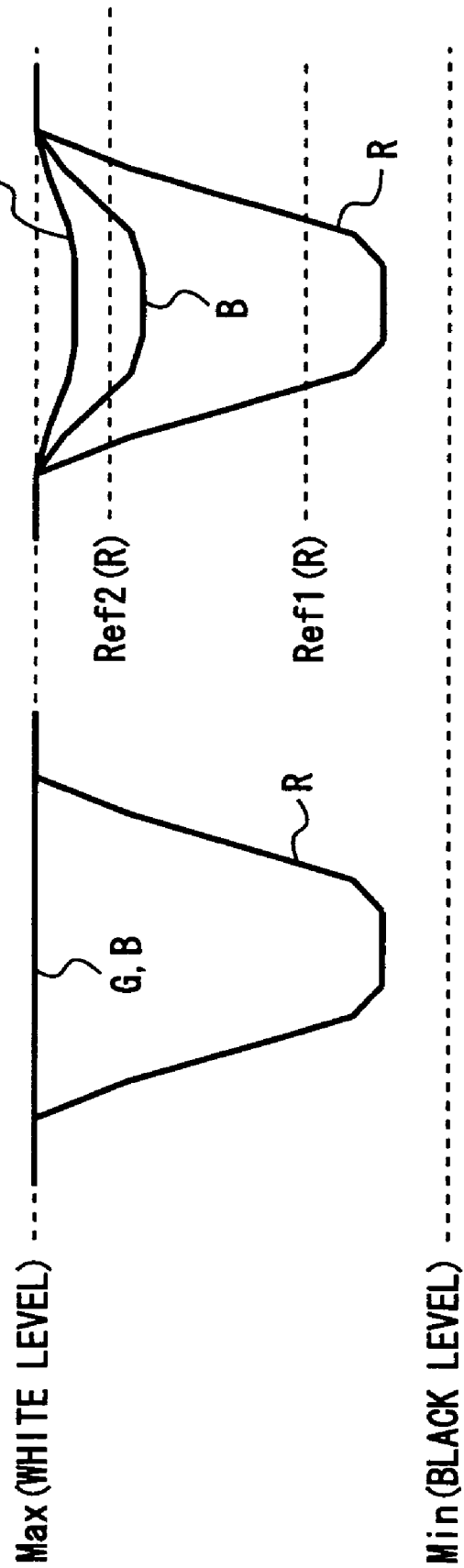

F I G. 1 0 A  THREE-BY-THREE FILTER

| C1 | C1 | B3 | B3 | B3 | C3 | C3 |
|----|----|----|----|----|----|----|
| C0 | C0 | B2 | A  | B2 | C2 | C2 |
| C1 | C1 | B3 | B3 | B3 | C3 | C3 |

F I G. 1 0 B  FIVE-BY-FIVE FILTER

| C1 | C1 | B3 | B3 | B3 | B3 | B3 | C3 | C3 |
|----|----|----|----|----|----|----|----|----|
| C1 | C1 | B3 | B3 | B3 | B3 | B3 | C3 | C3 |
| C0 | C0 | B2 | B2 | A  | B2 | B2 | C2 | C2 |
| C1 | C1 | B3 | B3 | B3 | B3 | B3 | C3 | C3 |
| C1 | C1 | B3 | B3 | B3 | B3 | B3 | C3 | C3 |

F I G. 1 0 C  SEVEN-BY-SEVEN FILTER

| C1 | C1 | B3 | B3 | B3 | B3 | B3 | B3 | B3 | C3 | C3 |
|----|----|----|----|----|----|----|----|----|----|----|
| C1 | C1 | B3 | B3 | B3 | B3 | B3 | B3 | B3 | C3 | C3 |
| C1 | C1 | B3 | B3 | B1 | B1 | B1 | B3 | B3 | C3 | C3 |
| C0 | C0 | B2 | B2 | B0 | A  | B0 | B2 | B2 | C2 | C2 |
| C1 | C1 | B3 | B3 | B1 | B1 | B1 | B3 | B3 | C3 | C3 |
| C1 | C1 | B3 | B3 | B3 | B3 | B3 | B3 | B3 | C3 | C3 |
| C1 | C1 | B3 | B3 | B3 | B3 | B3 | B3 | B3 | C3 | C3 |

| DOT REGION DATA | | SELECTOR OUTPUT |
|---|---|---|
| FOURTH LINE MEMORY | FIFTH LINE MEMORY | |
| 0 | 0 | 0 |
| 0 | 1 | 2 |
| 1 | 0 | 1 |
| 1 | 1 | 1 |

NOISE REGION

IMAGE PROCESSING APPARATUS AND IMAGE PROCESSING METHOD FOR REMOVING A NOISE GENERATED BY SCANNING A FOREIGN OBJECT FROM IMAGE DATA OBTAINED BY SCANNING AN ORIGINAL DOCUMENT

This application is based on Japanese Patent Application No. 2005-317821 filed with Japan Patent Office on Oct. 31, 2005, the entire content of which is hereby incorporated by reference.

BACKGROUND OF THE INVENTION

1. Field of the Invention

The present invention relates to an image processing apparatus and an image processing method, and more specifically to an image processing apparatus and an image processing method for removing a noise generated by scanning a foreign object from image data obtained by scanning an original document.

2. Description of the Related Art

In recent years, some scanners, facsimiles, copying machines, and the like are provided with an image scanning apparatus which has a line sensor placed in a fixed manner and formed by a plurality of photoelectric transducers aligned in a main scanning direction and which adopts a scanning mode in that an original document is scanned by the line sensor by conveying the original document in a sub-scanning direction orthogonal to the main scanning direction. This image scanning apparatus is provided with a transparent copyboard between the original document and the line sensor for positioning the conveyed original document in a scanning position. The light reflected by the original document is transmitted through the copyboard and received by the line sensor. Consequently, a problem arises when a foreign object is stuck on the copyboard and the line sensor scans the foreign object instead of the original document, thereby generating a streak of noise in the image data.

Japanese Patent Laying-Open Nos. 2003-198838 and United States Patent Application Publication No.US2003/0090742 describe the technologies for correcting a noise region in the image data obtained by scanning an original document generated due to a foreign object stuck on a copyboard. According to the technology described in Japanese Patent Laying-Open No. 2003-198838, the noise region within the image data is deleted from the image data and interpolated by an image obtained by enlarging a region in the vicinity of the noise region. In the case where the vicinity of the noise region is a region of dots, however, the size of the dots becomes enlarged so that the image quality cannot be enhanced. Moreover, United States Patent Application Publication No.US2003/0090742 describes the technology in which, according to the width of the noise region, pixel values of a plurality of pixels on either side of the noise region are copied only from the portion of its width. United States Patent Application Publication No.US2003/0090742, however, points out the problem of the unnaturalness of the resulting image obtained by simply copying an image adjacent to the noise region to a multi-valued gray image or color image.

SUMMARY OF THE INVENTION

The present invention is made to solve the above-described problems, and an object of the present invention is to provide an image processing apparatus and an image processing method capable of enhancing the quality of image after removing a noise from a region of dots of image data obtained by scanning an original document.

Another object of the present invention is to provide an image processing apparatus and an image processing method capable of enhancing the quality of image after removing a noise from image data obtained by scanning an original document.

To achieve the above-described objects, according to one aspect of the present invention, an image processing apparatus is provided with an image data obtaining portion to obtain image data by scanning an original document, a noise detecting portion to detect a noise from the obtained image data, a dot region detecting portion to detect a region of dots from the obtained image data, and a substituting portion to substitute a noise region with a substitution region that is located in the vicinity of the noise region and that is of the same size as the noise region if a region in the vicinity of the noise region including the noise detected by the noise detecting portion is included in the region of dots detected by the dot region detecting portion.

According to this aspect, the image processing apparatus scans an original document and obtains the image data, and detects a noise and a region of dots from the image data. Then, the image processing apparatus substitutes a noise region with a substitution region that is located in the vicinity of the noise region and that is of the same size as the noise region if a region in the vicinity of the noise region including the detected noise is included in the region of dots. In the case where the region in the vicinity of the noise region is a region of dots, it is highly likely that the noise region is the region of dots. When a pixel value of a pixel included in a region of dots is not substituted with a pixel value of a pixel of the region of dots in the vicinity but is substituted with a maximum value or an average value of pixel values of a plurality of pixels of vicinity pixels, for instance, a region not including dots would exist within the region of dots so that the noise becomes conspicuous and the image quality deteriorates. Since the noise region is substituted with the region of dots in the vicinity, the noise becomes inconspicuous. As a result, the image processing apparatus that is capable of enhancing the quality of image after removing the noise from the region of dots of image data obtained by scanning an original document can be provided.

According to another aspect of the present invention, an image processing apparatus is provided with an image data obtaining portion to obtain image data by scanning an original document, a noise detecting portion to detect a noise from the obtained image data, a dot region detecting portion to detect a region of dots from the vicinity of a noise region including the detected noise, and a correction portion to substitute a pixel value of a pixel included in the noise region with one substitution candidate selected from a plurality of substitution candidates based on a detected result of the dot region detecting portion.

According to this aspect, the image processing apparatus scans an original document and obtains the image data, detects a noise from the image data, and detects a region of dots from the vicinity of a noise region including the noise. Then, the image processing apparatus selects a substitution candidate to substitute a pixel value of a pixel included in the noise region from a plurality of substitution candidates depending on whether the region of dots is detected from the vicinity of the noise region or not. The image quality deteriorates if a pixel included in a region not including dots is substituted with a substitution candidate suited for correcting a noise included in the region of dots. Moreover, the image quality deteriorates if a pixel included in a region of dots is substituted with a substitution candidate suited for correcting a noise included in the region not including dots. Since the substitution candidate to substitute a pixel value of a pixel included in the noise region is selected from a plurality of substitution candidates depending on whether the region of dots is detected from the vicinity of the noise region or not, the image processing apparatus that enhances the quality of image after removing the noise can be provided.

Preferably, the correction portion includes a first substituting portion to substitute a pixel value of a pixel included in the noise region with a pixel value of a pixel included in a substitution region that is located in the vicinity of the noise region and that is of the same size as the noise region, and a selecting portion to enable the first substituting portion if a region of dots is detected from the vicinity of the noise region by the dot region detecting portion.

When a pixel value of a pixel included in a region of dots is substituted with a maximum value or an average value of pixel values of a plurality of pixels of vicinity pixels, for instance, a region not including dots would exist within the region of dots so that the noise becomes conspicuous. On the other hand, when a pixel value of a pixel included in a region of dots is substituted with a pixel value of a pixel included in the region of dots in the vicinity, dots would exist within the region of dots so that the noise becomes inconspicuous. Consequently, the quality of the image after removing the noise that exists within the region of dots can be enhanced.

According to a further aspect of the present invention, an image processing method includes the steps of obtaining image data by scanning an original document, detecting a noise from the obtained image data, detecting a region of dots from the obtained image data, and substituting a noise region with a substitution region that is located in the vicinity of the noise region and that is of the same size as the noise region if a region in the vicinity of the noise region including the noise detected in the step of detecting the noise is included in the region of dots detected in the step of detecting the region of dots.

According to a still further aspect of the present invention, an image processing method includes the steps of obtaining image data by scanning an original document, detecting a noise from the obtained image data, detecting a region of dots from the vicinity of a noise region including the detected noise, and substituting a pixel value of a pixel included in the noise region with one substitution candidate selected from a plurality of substitution candidates based on a detected result of the step of detecting the region of dots.

According to this aspect, the image processing method that is capable of enhancing the quality of image after removing the noise can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view illustrating a mechanism for oscillating a copyboard.

FIG. 5 is a plan view of the copyboard seen from its back side.

FIGS. 8A and 8B are diagrams showing an example of RGB data after inter-line correction.

FIGS. 10A to 10C are diagrams each showing an example of an edge extraction filter.

FIGS. 13A and 13B are diagrams each showing an example of an isolated point detection filter.

DESCRIPTION OF THE PREFERRED EMBODIMENT

Figure 1:
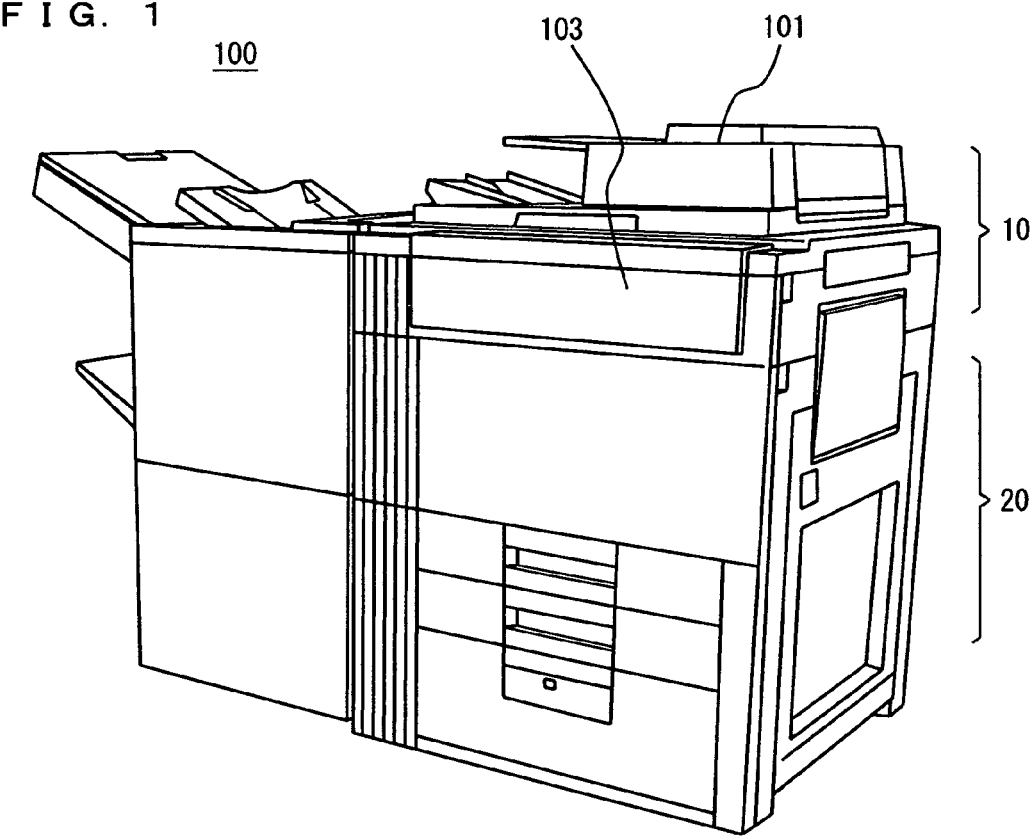
FIG. 1 is a perspective view of an MFP (Multi Function Peripheral) according to one embodiment of the present invention.

An embodiment of the present invention will be described below with reference to the drawings. In the following description, the same or corresponding parts are denoted by the same reference characters. Their names and function are also the same. Thus, a detailed description thereof will not be repeated.

FIG. 1 is a perspective view of an MFP (Multi Function Peripheral) according to one embodiment of the present invention. With reference to FIG. 1, an MFP 100 includes an image scanning apparatus 10 for scanning an original document, and an image forming apparatus 20 provided below image scanning apparatus 10. Image scanning apparatus 10 is partially housed in a body portion 103, and is provided with an automatic document feeder device (ADF) 101. Image forming apparatus 20 is housed below image scanning apparatus 10 in body portion 103, and forms an image on recording media such as paper based on the image data obtained by scanning the original document and outputted by image scanning apparatus 10. MFP 100 is provided with a communication interface for establishing connection with a facsimile and a network such as a local area network (LAN) and Public Switched Telephone Network (PSTN).

Figure 2:
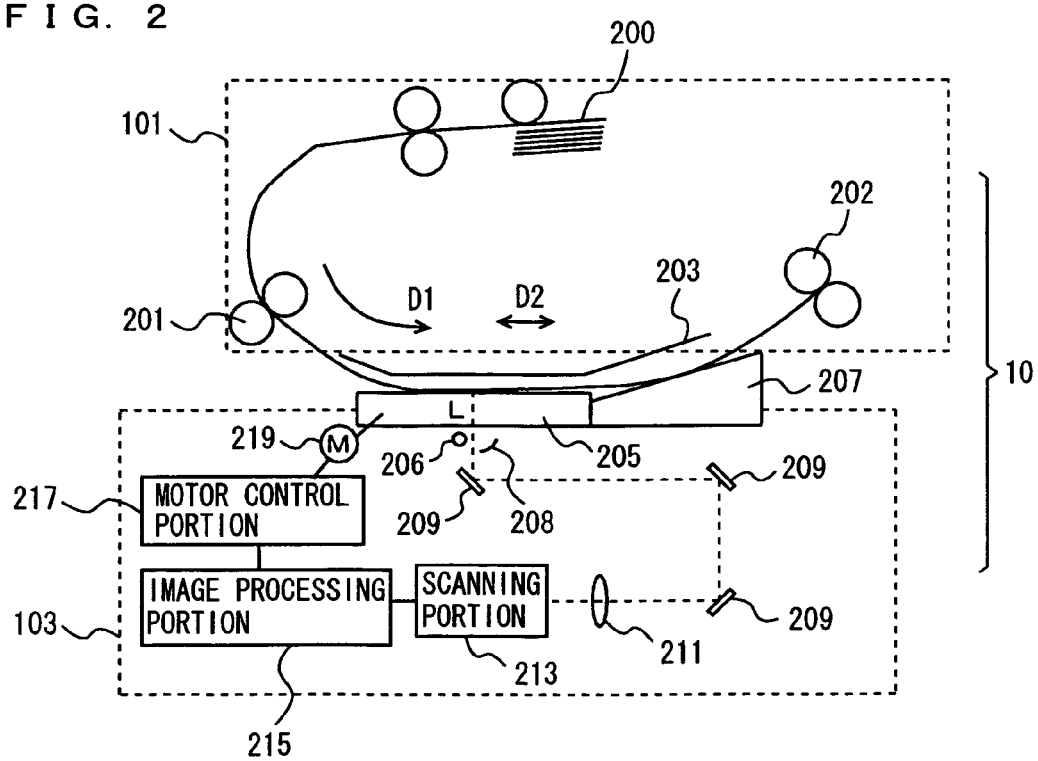
FIG. 2 is a schematic representation of an internal configuration of an image scanning apparatus.

FIG. 2 is a schematic representation of the internal configuration of image scanning apparatus 10. ADF 101 is provided with a timing roller pair 201 for conveying an original document 200 to a document scanning position L, an upper restricting board 203 for guiding the conveyance of the original document in the vicinity of document scanning position L, and a roller pair 202 for conveying original document 200 that passed through document scanning position L so as to discharge original document 200.

ADF 101 takes one sheet of the original document from the top of a plurality of original documents 200 loaded, and feeds it to timing roller pair 201. Thus, ADF 101 conveys a plurality of original documents 200 to document scanning position L one by one.

The portion of image scanning apparatus 10 being housed in body portion 103 includes a copyboard 205 formed of a transparent member, a paper passage guide 207 forming a portion of a conveyance route for an original document, a light source 206 for irradiating light, a reflection member 208 for reflecting the light from the light source, a scanning portion 213 having three line sensors aligned in a sub-scanning direction, a reflection mirror 209 for reflecting and guiding the reflected light from the original document to scanning portion 213, a lens 211 for focusing the reflected light from reflection mirror 209 on scanning portion 213, an image processing portion 215 for processing image data outputted by scanning portion 213, a motor 219 for oscillating copyboard 205, and a motor control portion 217 to control driving of motor 219 based on control data from image processing portion 215.

Original document 200 is conveyed in a direction of an arrow D1 between copyboard 205 and upper restricting board 203 by timing roller pair 201. Then, as the original document is conveyed, the image of the original document is scanned at document scanning position L by scanning portion 213. The direction in which ADF 101 conveys the original document is the sub-scanning direction at document scanning position L. Motor control portion 217 drives motor 219 during the image scanning operation and oscillates copyboard 205 in the directions of arrow D2. The direction of the oscillation of copyboard 205 is substantially parallel to the sub-scanning direction.

Scanning portion 213 is provided with three line sensors. Each of the three line sensors includes a plurality of photoelectric transducers aligned in a main scanning direction that is substantially perpendicular to the sub-scanning direction. The three line sensors respectively have filters of different spectral sensitivities. The light reflected from the original document is transmitted through the filters and received by the plurality of photoelectric transducers. More specifically, the three line sensors have filters that transmit light of respective wavelengths of red (R), green (G), and blue (B), respectively. Thus, the line sensor having a red (R) filter outputs R data that indicates the intensity of a red light from the light reflected from the original document, the line sensor having a green (G) filter outputs G data that indicates the intensity of a green light from the light reflected from the original document, and the line sensor having a blue (B) filter outputs B data that indicates the intensity of a blue light from the light reflected from the original document.

The three line sensors are disposed in a predetermined order spaced by a prescribed distance in the sub-scanning direction. Here, they are disposed in the order of red, green, and blue in the direction of conveyance of the original document at intervals of a distance of three lines in terms of scanned lines of the original document. Moreover, the spacing and the order in which the three line sensors are disposed are not limited to the above.

Since the three line sensors are disposed in the order of red, green, and blue spaced at the distance of three lines, the three line sensors simultaneously receive lights reflected at different locations of the original document. Therefore, the light reflected at a certain location of the original document is first received by the line sensor receiving the red light, and then after the original document is conveyed the distance of three lines, received by the line sensor receiving the green light, and then after the original document is further conveyed the distance of three lines, received by the line sensor receiving the blue light. This delay is adjusted by image processing portion 215 which will be described later.

In addition, although three line sensors are provided in scanning portion 213 according to this embodiment, more than three line sensors may be provided.

FIG. 3 is a perspective view illustrating a mechanism for oscillating a copyboard. With reference to FIG. 3, copyboard 205 is held by a copyboard holder 221. Copyboard holder 221 is held by a guide 220 such that it is slidable in the sub-scanning direction. Guide 220 is fixed to the body of image scanning apparatus 10. Two arms 222 are joined to one face of copyboard holder 221. Each arm 222 has a circular hole at the other end.

Two cams 223 are attached to a shaft 224 in positions corresponding to the two arms 222. Moreover, a gear 225 is attached at one end of shaft 224. Gear 225 is arranged such that it engages a gear 226 which is joined by a belt to a drive shaft of motor 219. When motor 219 rotates, the rotation is transmitted via the belt to gear 226, and gear 226 rotates. As gear 226 rotates, gear 225 and shaft 224 rotate. Cams 223 are disposed within the circular holes provided in arms 222. Consequently, the rotational movement of two cams 223 that accompanies the rotation of shaft 224 is converted into a reciprocating motion of copyboard holder 221. In addition, the mechanism of oscillating copyboard 205 is not limited to this, and may also be a mechanism using a drive source that produces a linear motion such as a piston that utilizes an electromagnet, air pressure, hydraulic pressure and the like, for instance.

Copyboard 205 oscillates parallel to the sub-scanning direction. While copyboard 205 moves in the direction opposite to the direction in which the original document is conveyed, copyboard 205 and the original document move in opposite directions so that the relative speed of copyboard 205 with respect to the line sensors differs from the relative speed of the original document with respect to the line sensors. On the other hand, while copyboard 205 moves in the direction of conveyance of the original document, the speed of copyboard 205 and the conveyance speed of the original document are identical in direction. It is preferred to vary the speed. In addition, although copyboard 205 is made to oscillate parallel to the sub-scanning direction here, the direction is not thus limited.

Figure 4A:
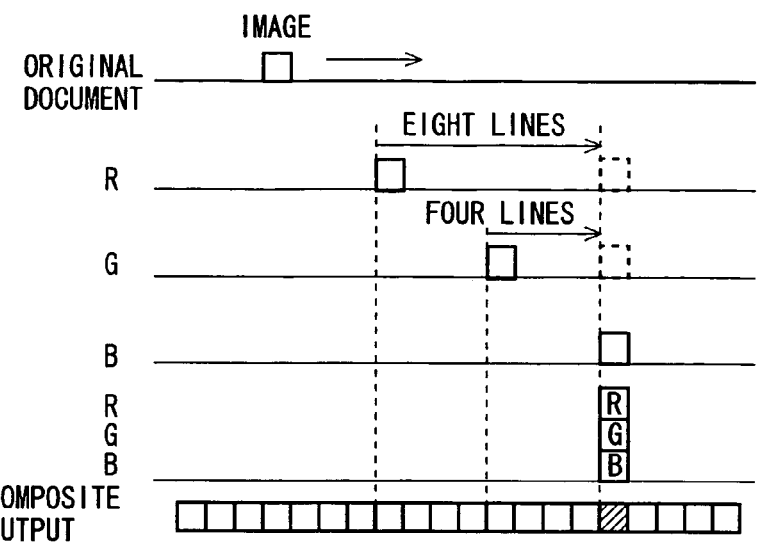
FIGS. 4A to 4C are diagrams for illustrating a principle of detecting from image data obtained by scanning an original document a noise generated by a foreign object stuck on the copyboard.
Figure 4B:
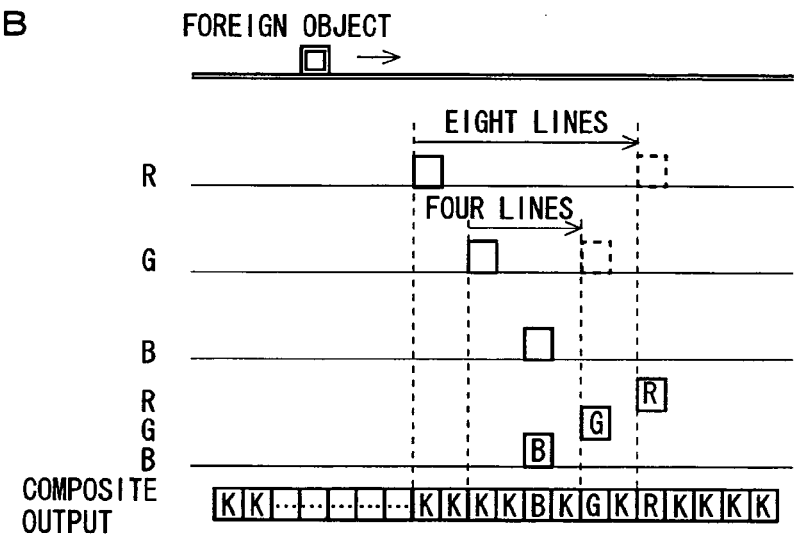
Figure 4C:
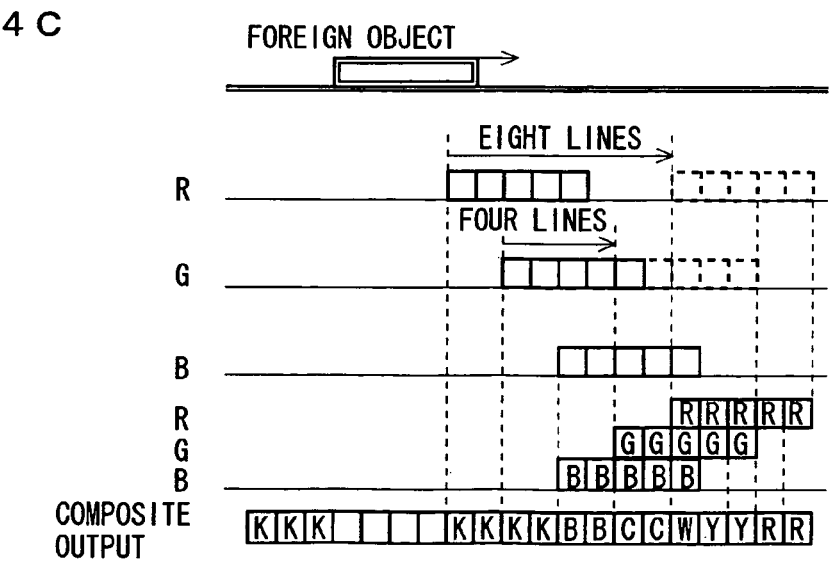

Now, the principle of detecting a noise generated by a foreign object stuck on copyboard 205 from image data obtained by scanning an original document with image scanning apparatus 10 according to this embodiment will be described. First, an in-line correction will be described. FIGS. 4A to 4C are diagrams for illustrating the principle of detecting from image obtained by scanning an original document a noise generated by scanning a foreign object. Here, the original document and copyboard 205 are conveyed in the direction of an arrow in the drawing, and the moving speed of copyboard 205 is set to be identical in direction to and twice as fast as the speed of conveyance of the original document. Moreover, it is assumed that the three line sensors, in the order of a line sensor receiving the red light, a line sensor receiving the green light, and a line sensor receiving the blue light, are disposed in the direction of conveyance of the original document at intervals of a distance of three lines. In addition, an output of the line sensor receiving the red light is indicated by R, an output of the line sensor receiving the green light is indicated by G, and an output of the line sensor receiving the blue light is indicated by B.

FIG. 4A is a diagram for illustrating the in-line correction. With reference to FIG. 4A, the original document is conveyed in the direction of the arrow in the drawing. An image of a portion of the original document is first scanned by the line sensor receiving the red light disposed farthest upstream in the direction of conveyance of the original document. Then, the same portion of the original document is conveyed for a distance of four lines and the image of the same portion of the original document is scanned by the line sensor receiving the green light. Further, the same portion of the original document is conveyed for the distance of four lines and the image thereof is scanned by the line sensor receiving the blue light.

In this manner, since the image of a certain portion of the original document is scanned by three line sensors at different time, the three data simultaneously outputted by the three line sensors are data outputted by scanning different parts of the original document. In the in-line correction, the output timing of three data outputted by the three line sensors is adjusted such that the outputted data become data that are outputted by the three line sensors respectively scanning the same portion of the original document. More specifically, an output R is delayed by eight lines, and an output G is delayed by four lines. A composite output is the output obtained by compositing in-line corrected output R, output G, and output B.

FIG. 4B is a diagram for describing the composite output that is outputted when a foreign object stuck on the copyboard is scanned. The foreign object stuck on copyboard 205 is first scanned by the line sensor receiving the red light disposed farthest upstream in the direction of conveyance of the original document. Then, the foreign object is conveyed for a distance of four lines and scanned by the line sensor receiving the green light. Here, copyboard 205 moves at twice the speed and in the same direction with respect to the speed of conveyance of the original document so that the foreign object moves the distance of four lines during the time in which a line sensor scans two lines of the original document. Consequently, there is a lag of time for scanning of two lines between the time point at which the red line sensor scans the foreign object and the time point at which the green line sensor scans the foreign object. Further, the foreign object is conveyed for the distance of four lines and scanned by the line sensor receiving the blue light. Copyboard 205 moves at twice the speed and in the same direction with respect to the speed of conveyance of the original document so that there is a lag of time for scanning of two lines between the time point at which the green line sensor scans the foreign object and the time point at which the blue line sensor scans the foreign object.

Then, by the in-line correction, output R outputted by the line sensor receiving the red light scanning the foreign object is delayed by eight lines, and output G outputted by the line sensor receiving the green light scanning the foreign object is delayed by four lines. Thus, in the composite output obtained by compositing output R, output G, and output B in-line corrected, output R, output G, and output B, respectively obtained by scanning the foreign object, are not of the same line but are shifted by two lines.

Moreover, the diagram shows the composite output in the case where a white-colored foreign object such as paper dust is stuck on copyboard 205 and a black-colored original document is being scanned. In this case, although a white-colored foreign object is scanned, the composite output becomes an output of blue, green, and red separated into three lines. In this manner, a foreign object stuck on copyboard 205 is divided into a plurality of lines within the image. Thus, the noise generated by scanning the foreign object is reduced in comparison to the case where the scanning is performed without moving copyboard 205.

FIG. 4C is another diagram for describing the composite output that is outputted when the foreign object stuck on the copyboard is scanned. FIG. 4C shows as an example the case where a foreign object of a size of ten lines in the sub-scanning direction is scanned. Copyboard 205 moves at twice the speed and in the same direction with respect to the speed of conveyance of the original document so that the foreign object is scanned as having the size of five lines.

The foreign object stuck on copyboard 205 is first scanned by the line sensor receiving the red light disposed farthest upstream in the direction of conveyance of the original document. Then, the foreign object is conveyed for the distance of four lines and scanned by the line sensor receiving the green light. There is a lag of time for scanning of two lines between the time point at which the red line sensor scans the foreign object and the time point at which the green line sensor scans the foreign object. Further, the foreign object is conveyed for the distance of four lines and scanned by the line sensor receiving the blue light. There is a lag of time for scanning of two lines between the time point at which the green line sensor scans the foreign object and the time point at which the blue line sensor scans the foreign object.

Then, by the in-line correction, output R outputted by the line sensor receiving the red light scanning the foreign object is delayed by eight lines, and output G outputted by the line sensor receiving the green light scanning the foreign object is delayed by four lines. Thus, in the composite output obtained by compositing output R, output G, and output B in-line corrected, output R of five lines obtained by scanning the foreign object, output G of five lines obtained by scanning the foreign object, and output B of five lines obtained by scanning the foreign object are not of the same line but are shifted by two lines. Moreover, the diagram shows the composite output in the case where a white-colored foreign object such as paper dust is stuck on copyboard 205 and a black-colored original document is being scanned. In this case, although a white-colored foreign object is scanned, the composite output becomes an output of colors that change from blue, to cyan, to white, to yellow, and to red in this order.

In this manner, the foreign object stuck on copyboard 205 is divided into a plurality of lines within the image. The noise is detected by extracting these divided lines as a feature point for each color. In addition, such division reduces the noise generated by scanning the foreign object.

FIG. 5 is a plan view of the copyboard seen from its back side. With reference to FIG. 5, copyboard 205 has a mark 205A at one end. Mark 205A is of a shape whose length in the main scanning direction varies depending on the position in the sub-scanning direction and is in monochrome. Here, mark 205A is triangular in shape and is black in color. In addition, one side of mark 205A is disposed in parallel to one side of copyboard 205.

With the use of scanning portion 213 or the use of a sensor provided separately from scanning portion 213 and fixed to body portion 103, it becomes possible to detect the relative position of copyboard 205 with respect to scanning portion 213 by detecting the length of mark 205A in the main scanning direction.

Figure 6:
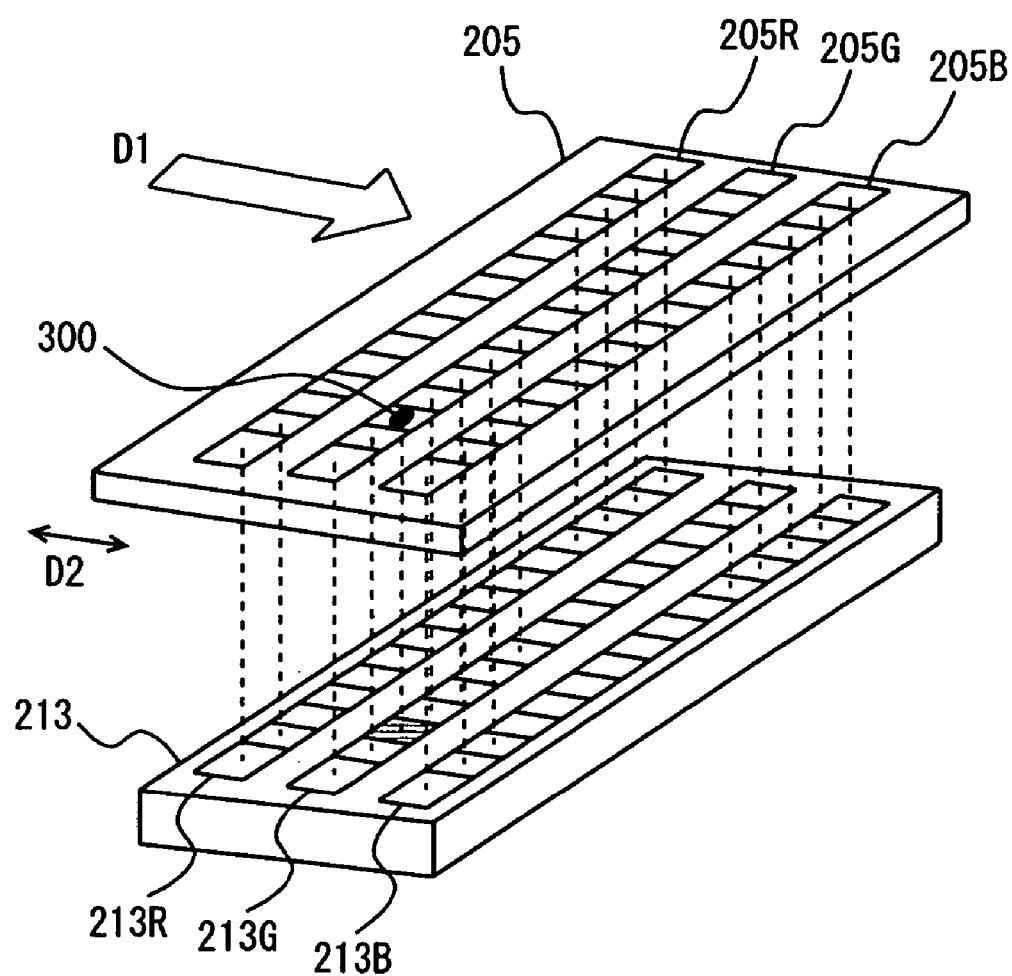
FIG. 6 is a diagram showing a scanning region on the copyboard to be scanned by a scanning portion.

FIG. 6 is a diagram showing a scanning region on copyboard 205 to be scanned by scanning portion 213. Scanning portion 213 includes a line sensor 213R having a red (R) filter, a line sensor 213G having a green (G) filter, and a line sensor 213B having a blue (B) filter. Line sensors 213R, 213G, and 213B are disposed in a direction of conveyance D1 of the original document in the order of line sensors 213R, 213G, and 213B.

Line sensor 213R receives the light that transmitted through a region 205R of copyboard 205. Line sensor 213G receives a light that transmitted through a region 205G of copyboard 205. Line sensor 213B receives the light that transmitted through a region 205B of copyboard 205. Line sensors 213R, 213G, and 213B are disposed such that regions 205R, 205G, and 205B have a spacing of three lines. The original document first passes through region 205R, and then passes through region 205G, and finally passes through region 205B. Therefore, the light reflected at a certain location of the original document is first received by line sensor 213R receiving the red light, and thereafter received by line sensor 213G receiving the green light, and finally received by line sensor 213B receiving the blue light. Line sensors 213R, 213G, and 213B are disposed at intervals of the distance of three lines so that line sensors 213R, 213G, and 213B never simultaneously receive the light reflected at the same location of the original document.

Here, it is assumed that a foreign object 300 having a length of four lines or less is stuck on copyboard 205. In this case, copyboard 205 moves in oscillation parallel to the sub-scanning direction so that foreign object 300 never simultaneously exists in more than one of regions 205R, 205G, and 205B. FIG. 6 shows the case where foreign object 300 exists in region 205G. In this case, the light reflected by foreign object 300 is received only by line sensor 213G and is not received by line sensors 213R and 213B.

In addition, since copyboard 205 oscillates, there are a case in which copyboard 205 moves in the direction of conveyance D1 of the original document and a case in which copyboard 205 moves in the direction opposite to the direction of conveyance D1 of the original document. While copyboard 205 moves in the direction of conveyance D1 of the original document, the foreign object moves first to region 205R, then to region 205G, and finally to region 205B in this order. Conversely, while copyboard 205 moves in the direction opposite to the direction of conveyance D1 of the original document, the foreign object moves first to region 205B, then to region 205G, and finally to region 205R in this order. Therefore, while copyboard 205 moves in the direction of conveyance D1 of the original document, the light reflected by foreign object 300 is first received by line sensor 213R, then by line sensor 213G, and finally by line sensor 213B. Moreover, while copyboard 205 moves in the opposite direction to the direction of conveyance D1 of the original document, the light reflected by foreign object 300 is first received by line sensor 213B, then by line sensor 213G, and finally by line sensor 213R.

While copyboard 205 moves in the direction of conveyance of the original document, the noise due to scanning of the foreign object appears first in R data outputted by line sensor 213R, then in G data outputted by line sensor 213G, and finally in B data outputted by line sensor 213B in this order. In addition, while copyboard 205 moves in the direction opposite to the direction of conveyance of the original document, the noise due to scanning of the foreign object appears first in B data outputted by line sensor 213B, then in G data outputted by line sensor 213G, and finally in R data outputted by line sensor 213R in this order. In other words, the order of the data in which the noise generated by scanning the foreign object appears is determined by the direction of movement of copyboard 205. By determining the order in which a noise is detected from R data, G data, and B data, the accuracy with which the noise is detected can be improved.

Figure 7:
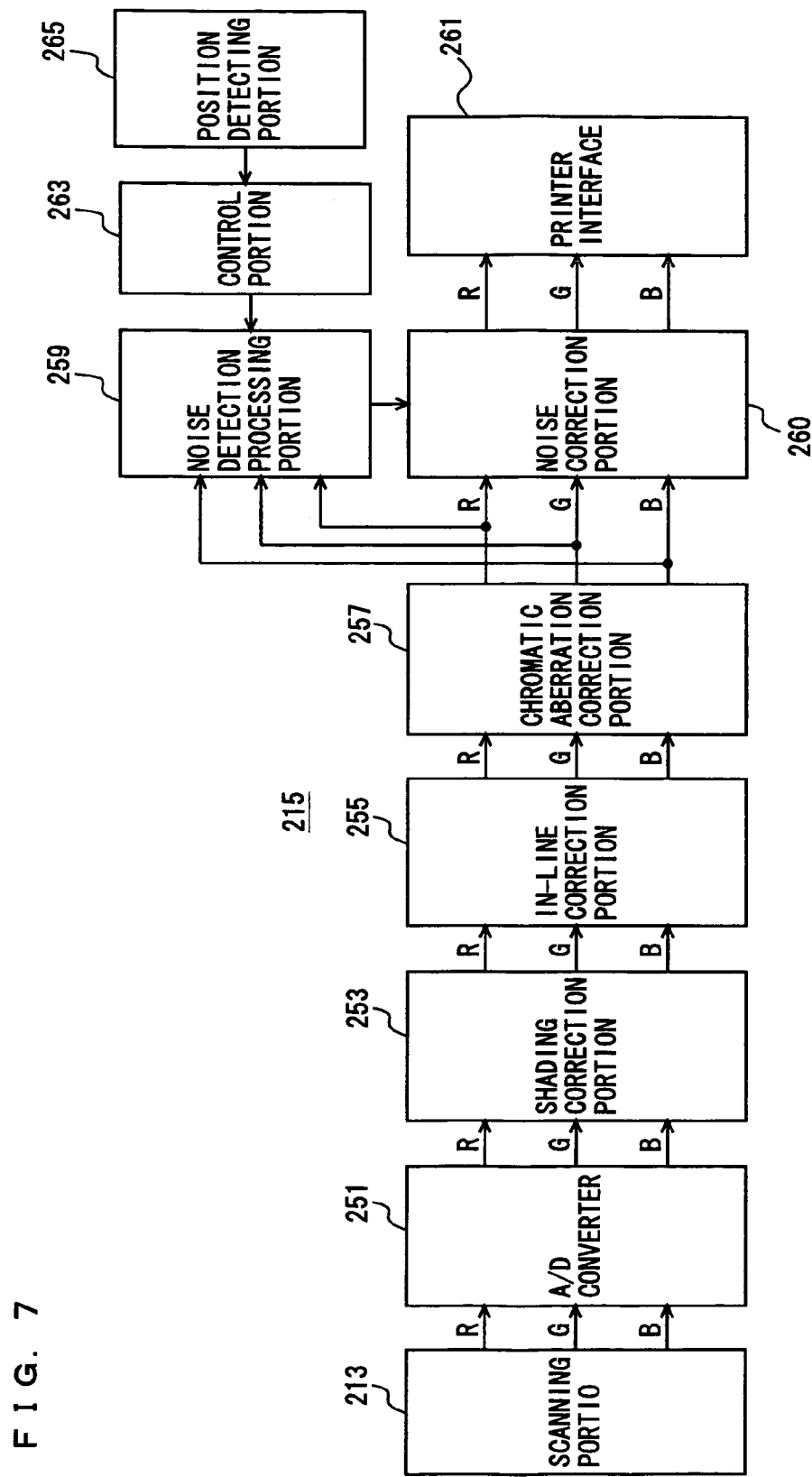
FIG. 7 is a block diagram showing an arrangement of an image processing portion.

FIG. 7 is a block diagram showing an arrangement of an image processing portion. With reference to FIG. 7, R data, G data, and B data are inputted from scanning portion 213 to image processing portion 215. Image processing portion 215 is provided with an analog-to-digital converter (AID converter) 251 for converting R data, G data, and B data of analog signals inputted from scanning portion 213 into digital signals, a shading correction portion 253 for correcting the unevenness of illumination and the like of light source 206, an in-line correction portion 255, a chromatic aberration correction portion 257 for correcting the distortion in the main scanning direction due to lens 211, a noise detection processing portion 259 for detecting a noise from each of R data, G data, and B data, a noise correction portion 260 for executing a process to remove the noise, a control portion 263 for controlling the entire image processing portion 215, and a printer interface 261 for outputting an image to image forming apparatus 20. A position detecting portion 265 for detecting the position of copyboard 205 is connected to control portion 263. Position detecting portion 265 detects the length in the main scanning direction of mark 205A provided on copyboard 205.

In-line correction portion 255 delays R data by eight lines and G data by four lines. Thus, R data, G data, and B data outputted by line sensors 213R, 213G, and 213B scanning an original document are synchronized such that they correspond to the same line of the original document. This is because line sensors 213R, 213G, and 213B are arranged at intervals of the distance of three lines in the sub-scanning direction, as described above.

R data, G data, and B data are inputted from chromatic aberration correction portion 257 to noise detection processing portion 259. For each of R data, G data, and B data inputted from chromatic aberration correction portion 257, noise detection processing portion 259 detects a noise pixel as a pixel obtained by scanning a foreign object, and then outputs logical data that indicate the noise pixel as "1" and other pixels as "0" to noise correction portion 260 and control portion 263. The details thereof will be described later.

Noise correction portion 260 receives input of R data, G data, and B data from chromatic aberration correction portion 257 and input of logical data that indicate the noise pixel as "1" and other pixels as "0" for each of R data, G data, and B data. Noise correction portion 260 corrects the noise pixel of R data, G data, and B data based on the logical data corresponding to each of R data, G data, and B data. Noise correction portion 260 will be described in detail later. Noise correction portion 260 outputs R data, G data, and B data with the noise pixel corrected to printer interface 261.

Control portion 263 receives input of the position of copyboard 205 from position detecting portion 265 and input of logical data that indicate the noise pixel as "1" and other pixels as "0" from noise detection processing portion 259. From such data, control portion 263 specifies the position of the foreign object on copyboard 20. More specifically, it specifies the position on copyboard 205 in the sub-scanning direction from the position of copyboard 205 and from a line number of the logical data, and specifies the position on copyboard 205 in the main scanning direction from the position of the noise pixel of the logical data.

FIGS. 8A and 8B are diagrams showing an example of RGB data after the in-line correction. FIG. 8A shows an example of RGB data in the case where a black-colored foreign object stuck on the copyboard exists in region 205R corresponding to line sensor 213R while a white-colored region of an original document is being scanned. Moreover, although the detection of the black-colored foreign object as a noise is described here, the foreign object can be of a chromatic color. In addition, although the case of a white-colored original document being scanned is described as an example here, the color of the original document is not limited to white and can be any other color.

With reference to FIG. 8A, line sensor 213R scans a black-colored foreign object so that R data outputted by line sensor 213R becomes low in lightness. Line sensors 213G and 213B scan the white-colored region of the original document so that G data and B data outputted by line sensors 213G and 213B have high lightness. Moreover, here, lightness refers to output values of three line sensors 213R, 213G, and 213B corresponding to the reflected light.

The combination of RGB data shown in FIG. 8A is rarely outputted as a result of scanning of an original document. On the other hand, of the combinations of RGB data outputted by scanning the original document, the closest combination to the combination shown in FIG. 8A is a case in which a region of cyan which is a complementary color of red is scanned. FIG. 8B is a diagram showing RGB data outputted by scanning portion 213 when a cyan region of the original document is scanned. While R data is significantly lowered in lightness, G data and B data are also lowed in lightness. Between the RGB data shown in FIG. 8A and the RGB data shown in FIG. 8B, there is a big difference of B data and G data being affected or unaffected. By detecting this difference, the black-colored foreign object can be detected as a noise without erroneously detecting a cyan line as the noise.

Thus, the change in lightness of R data that is significantly lowered in lightness can be detected using a threshold value Ref1(R). Moreover, the change in lightness of B data is detected using a threshold value Ref2(B). Threshold value Ref2(B) should be the smallest value of the following values. Threshold values Ref2(R), Ref2(G), and Ref2(B) are indicated below.

(1) When detecting a foreign object of an achromatic color having high lightness To prevent a cyan line from being erroneously detected as a noise, when cyan which is a complementary color of red is scanned, a difference between the lightness outputted by either one of line sensors 213G and 213B other than line sensor 213R and the maximum value of lightness (255) can be set as Ref2(G) or Ref2(B). To prevent a magenta line from being erroneously detected as a noise, when magenta which is a complementary color of green is scanned, a difference between the lightness outputted by either one of line sensors 213R and 213B other than line sensor 213G and the maximum lightness (255) can be set as Ref2(R) or Ref2(B). To prevent a yellow line from being erroneously detected as a noise, when yellow which is a complementary color of blue is scanned, a difference between the lightness outputted by either one of line sensors 213R and 213G other than line sensor 213B and the maximum lightness (255) can be set as Ref2(R) or Ref2(G).

(2) When detecting a foreign object of an achromatic color having low lightness

To prevent a red line from being erroneously detected as a noise, when red is scanned, a difference between the lightness outputted by either one of line sensors 213G and 213B other than line sensor 213R and the minimum value of lightness (0) can be set as Ref2(G) or Ref2(B). To prevent a green line from being erroneously detected as a noise, when green is scanned, a difference between the lightness outputted by either one of line sensors 213R and 213B other than line sensor 213G and the minimum value (0) can be set as Ref2(R) or Ref2(B). To prevent a blue line from being erroneously detected as a noise, when blue is scanned, a difference between the lightness outputted by either one of line sensors 213R and 213G other than line sensor 213B and the minimum value (0) can be set as Ref2(R) or Ref2(G).

In this manner, although a plurality of values can be derived for each of threshold values Ref2(R), Ref2(G), and Ref2(B), the smallest value of the respective values should be used.

Figure 9:
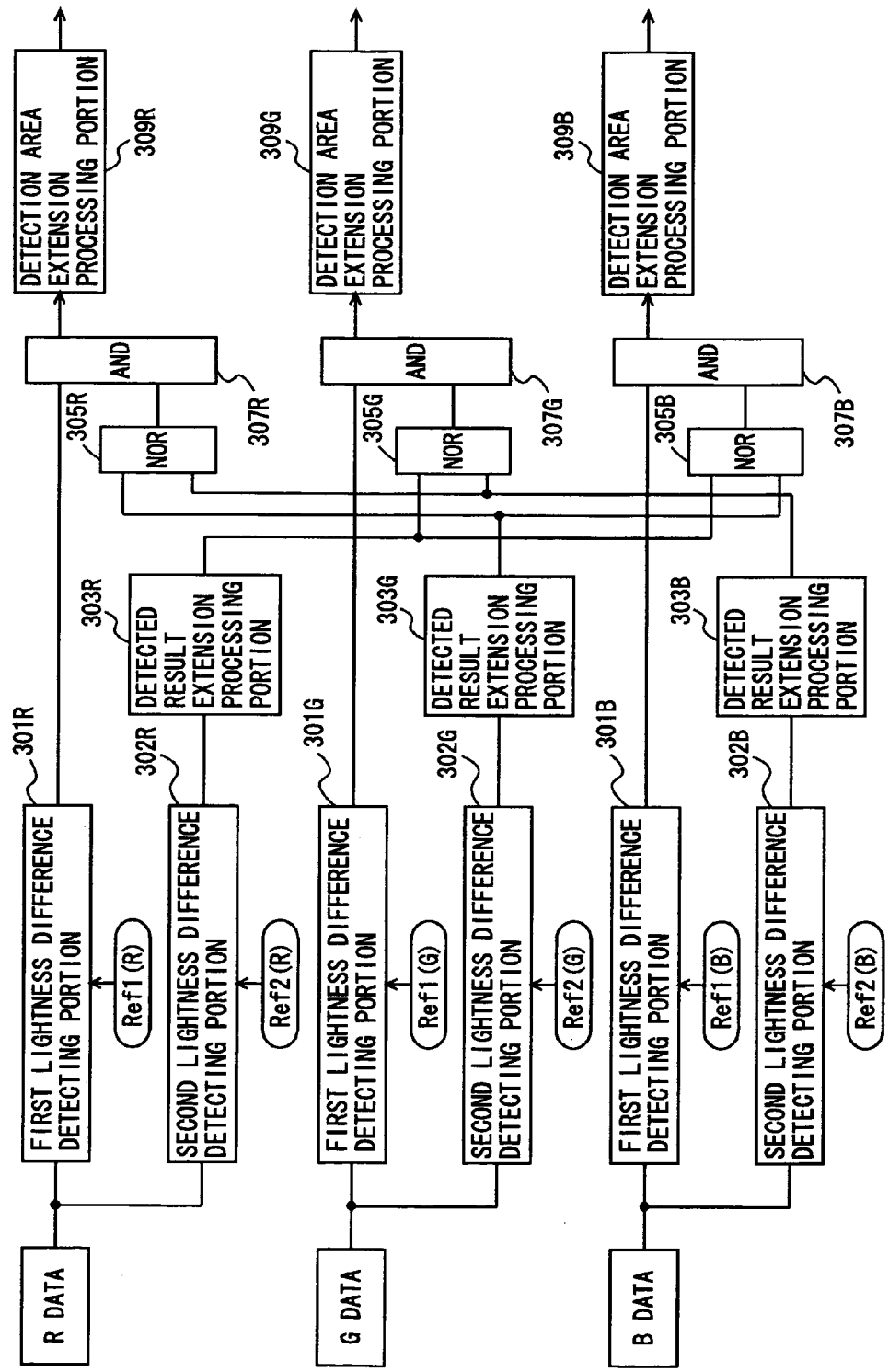
FIG. 9 is a block diagram showing an arrangement of a noise detection processing portion of the image scanning apparatus according to this embodiment.

FIG. 9 is a block diagram showing an arrangement of a noise detection processing portion of the image scanning apparatus according to this embodiment. With reference to FIG. 9, noise detection processing portion 259 includes first lightness difference detecting portions 301R, 301G, and 301B and second lightness difference detecting portions 302R, 302G, and 302B for extracting a region having a prescribed characteristic from each of R data, G data, and B data inputted, detected result extension processing portions 303R, 303G, and 303B for extending the region extracted by second lightness difference detecting portions 302R, 302G, and 302B to the vicinity, NOR elements 305R, 305G, and 305B, AND elements 307R, 307G, and 307B, and detection area extension processing portions 309R, 309G, and 309B.

R data, G data, and B data are each inputted into noise detection processing portion 259 line by line in order. Moreover, a plurality of lines of R data, G data, and B data can be inputted together at once, or the lines for an entire image can be inputted together at once.

Since first lightness difference detecting portions 301R, 301G, and 301B only differ in the data handled and are identical in their function, first lightness difference detecting portion 301R will be described here. R data and a threshold value Ref1(R) are inputted to first lightness difference detecting portion 301R. First lightness difference detecting portion 301R extracts a region having a prescribed characteristic of a first level from the R data. The region having the prescribed characteristic of the first level is a region with little change in lightness where the difference between the lightness of this region and the lightness of the vicinity region is at least threshold value Ref1(R). Such region need only be the size of at least one pixel. Here, a pixel included in the region having the prescribed characteristic of the first level is referred to as a first characteristic pixel.

First lightness difference detecting portion 301R extracts a region having the prescribed characteristic of the first level using an edge extraction filter. The edge extraction filter includes a filter corresponding to each of a plurality of sizes of edge regions. First lightness difference detecting portion 301R executes the filtering process using threshold value Ref1(R) for a plurality of filters. Then, when the condition is satisfied that a processing target pixel is included in an edge region, first lightness difference detecting portion 301R regards the processing target pixel as the first characteristic pixel and finds the size of the edge region from the edge extraction filter having satisfied the condition.

FIGS. 10A to 10C are diagrams each showing an example of an edge extraction filter. Although the edge extraction filters will be described here with respect to R data, the same edge extraction filters as those used for R data are used for G data and B data. FIG. 10A shows an edge extraction filter used for detecting an edge region of the size of three pixels. FIG.

10B shows an edge extraction filter used for detecting an edge region of the size of five pixels. FIG. 10C shows an edge extraction filter used for detecting an edge region of the size of seven pixels. Moreover, each pixel is denoted by a reference character in order to specify the pixel. The pixel denoted by the reference character A is the processing target pixel. The conditions to be satisfied by using these edge extraction filters are as follows.

(Condition A1) The difference between an average value Ave1 of processing target pixel A and its vicinity pixels B0, B1, B2, and B3 and an average value Ave2 of pixels C0, C1, C2, and C3 in regions on both sides in the main scanning direction which contact pixels B0, B1, B2, and B3 in the vicinity of processing target pixel A in the main scanning direction must be at least a fixed value. If a pixel value of each pixel is indicated by reference characters, the condition can be represented by the following expressions.

(Condition A1 for white-colored foreign object)

$$Ave1 > Ave2 + Ref1(R)$$

(Condition A1 for black-colored foreign object)

$$Ave2 > Ave1 + Ref1(R)$$

where Ave1=average (A, B0, B1, B2, B3) and Ave2=average (C0, C1, C2, C3).

(Condition A2) The difference between an average value Ave1 of processing target pixel A and its vicinity pixels B0, B1, B2, and B3 and an average value Ave3 of pixels C0 and C1 in a left-side region in the main scanning direction which contact pixels B0, B1, B2, and B3 in the vicinity of processing target pixel A on the left side in the main scanning direction must be at least a fixed value. If a pixel value of each pixel is indicated by reference characters, the condition can be represented by the following expressions.

(Condition A2 for white-colored foreign object)

$$Ave1 > Ave3 + Ref1(R)$$

(Condition A2 for black-colored foreign object)

$$Ave3 > Ave1 + Ref1(R)$$

where Ave3=average (C0, C1).

(Condition A3) The difference between an average value Ave1 of processing target pixel A and its vicinity pixels B0, B1, B2, and B3 and an average value Ave4 of pixels C2 and C3 in a right-side region in the main scanning direction which contact pixels B0, B1, B2, and B3 in the vicinity of processing target pixel A on the right side in the main scanning direction must be at least a fixed value. If a pixel value of each pixel is indicated by reference characters, the condition can be represented by the following expressions.

(Condition A3 for white-colored foreign object)

$$Ave1 > Ave4 + Ref1(R)$$

(Condition A3 for black-colored foreign object)

$$Ave4 > Ave1 + Ref1(R)$$

where Ave4=average (C2, C3).

(Condition A4) The pixel value of processing target pixel A must be the greatest or the smallest of the pixel values of pixels A, B0, B2, C0, and C2 which are identical in position in the sub-scanning direction and aligned in the main scanning direction.

(Condition A4 for white-colored foreign object)

$$A = MAX(A, B0, B2, C0, C2)$$

(Condition A4 for black-colored foreign object)

$$A = MIN(A, B0, B2, C0, C2)$$

where MAX (A, B0, B2, C0, C2) represents the maximum value of the pixel values of pixels A, B0, B2, C0, and C2, and MIN (A, B0, B2, C0, C2) represents the minimum value of the pixel values of pixels A, B0, B2, C0, and C2.

Although the edge extraction filters having the respective sizes of three pixels and five pixels are illustrated here, it goes without saying that an edge extraction filter of a size of one pixel and an edge extraction filter of a size of seven pixels and larger can be used.

Going back to FIG. 9, first lightness difference detecting portion 301R regards the processing target pixel as a first characteristic pixel on the condition that all of the above conditions A1, A2, A3 and A4 are satisfied in any one of the plurality of edge extraction filters described above. First lightness difference detecting portion 301R outputs logical data that indicate the first characteristic pixel as "1" and other pixels as "0" to AND element 307R. The logical data corresponds to the pixel value of the R data and consists of the same number as the pixel value. First lightness difference detecting portion 301G regards the processing target pixel as a first characteristic pixel on the condition that all of the above conditions A1, A2, A3 and A4 are satisfied in any one of the plurality of edge extraction filters described above. As the threshold value, however, Ref1(G) is used instead of Ref1(R). First lightness difference detecting portion 301G outputs logical data that indicate the first characteristic pixel as "1" and other pixels as "0" to AND element 307G. The logical data corresponds to the pixel value of the G data and consists of the same number as the pixel value. First lightness difference detecting portion 301B regards the processing target pixel as a first characteristic pixel on the condition that all of the above conditions A1, A2, A3 and A4 are satisfied in any one of the plurality of edge extraction filters described above. As the threshold value, however, Ref1(B) is used instead of Ref1(R). First lightness difference detecting portion 301B outputs logical data that indicate the first characteristic pixel as "1" and other pixels as "0" to AND element 307B. The logical data corresponds to the pixel value of the B data and consists of the same number as the pixel value.

Since second lightness difference detecting portions 302R, 302G, and 302B only differ in the data handled and are identical in their function, second lightness difference detecting portion 302R will be described here. R data and a threshold value Ref2(R) are inputted to second lightness difference detecting portion 302R. Second lightness difference detecting portion 302R extracts a region having a prescribed characteristic of a second level from the R data. The region having the prescribed characteristic of the second level is a region with little change in lightness where the difference between the lightness of this region and the lightness of the vicinity region is at least threshold value Ref2(R). Such region need only be the size of at least one pixel. Here, a pixel included in the region having the prescribed characteristic of the second level is referred to as a second characteristic pixel. Threshold value Ref2(R) is a value smaller than threshold value Ref1(R).

Second lightness difference detecting portion 302R extracts a region having the prescribed characteristic of the second level using an edge extraction filter. The edge extraction filter includes a filter corresponding to each of a plurality of sizes of edge regions. Second lightness difference detecting portion 302R executes the filtering process using threshold value Ref2(R) for a plurality of filters. Then, when the condition is satisfied that a processing target pixel is included in an edge region, second lightness difference detecting portion 302R regards the processing target pixel as the second characteristic pixel and finds the size of the edge region from the edge extraction filter having satisfied the condition.

Second lightness difference detecting portion 302R regards the processing target pixel as a second characteristic pixel on the condition that all of the above conditions A1, A2, A3 and A4 are satisfied in any one of the plurality of edge extraction filters shown in FIGS. 10A to 10C. As the threshold value, however, Ref2(R) is used instead of Ref1(R). Second lightness difference detecting portion 302R outputs logical data that indicate the second characteristic pixel as "1" and other pixels as "0" to detected result extension processing portion 303R. The logical data corresponds to the pixel value of the R data and consists of the same number as the pixel value. Detected result extension processing portion 303R extends the region having the prescribed characteristic of the second level by setting a pixel in the vicinity of the second characteristic pixel extracted by second lightness difference detecting portion 302R to be a second characteristic pixel. In other words, of the logical data inputted from second lightness difference detecting portion 302R, detected result extension processing portion 303R changes to "1" the value of a pixel having the value of "0" in the vicinity of a pixel having the value of "1." Consequently, the accuracy of noise detection can be improved. Detected result extension processing portion 303R outputs to NOR elements 305G and 305B the logical data with the region extended. Detected result extension processing portions 303G and 303B only differ in the handled data from and are identical in function to detected result extension processing portion 303R so that the description thereof will not be repeated here.

The logical data with the region extended are respectively inputted from detected result extension processing portions 303G and 303B to NOR element 305R. NOR element 305R outputs to AND element 307R logical data obtained by inverting an OR of two logical data inputted. In other words, NOR element 305R outputs to AND element 307R the logical data that indicates a pixel which is not a second characteristic pixel in either of G data and B data as "1" and a pixel which is a second characteristic pixel in at least one of G data and B data as "0." AND element 307R outputs to detection area extension processing portion 309R an AND of the logical data inputted from first lightness difference detecting portion 301R and the logical data inputted from NOR element 305R. In other words, AND element 307R outputs to detection area extension processing portion 309R the logical data that indicates a pixel which is a first characteristic pixel in R data but not an extended second characteristic pixel in either of B data and G data as "1" and other pixels as "0." The logical data outputted by AND element 307R indicates an edge pixel which is a first characteristic pixel in the R data but not an extended second characteristic pixel in either of the G data and the B data. The edge pixel is a pixel obtained by line sensor 213R scanning a foreign object stuck on copyboard 205 and forms a main scanning direction edge which is a part of a plurality of edge pixels aligned in the sub-scanning direction.

NOR elements 305G and 305B only differ in the handled data from and are identical in function to NOR element 305R so that the description thereof will not be repeated here.

Logical data is inputted from AND element 307R to detection area extension processing portion 309R. Detection area extension processing portion 309R specifies a region which is the target of correction or a correction target region that includes a pixel in the vicinity of a pixel determined as an edge pixel by AND element 307R. The pixel determined as an edge pixel by AND element 307R has a value that can be obtained by scanning of a foreign object stuck on the copyboard, and the value is of a noise. Of the logical data inputted from AND element 307R, the value of a pixel having the value of "0" in the vicinity of a pixel having the value of "1" is changed to "1" by detection area extension processing portion 309R, thereby extending the range of pixels to be the target of correction and thus enhancing the image quality. Detection area extension processing portion 309R outputs the logical data that indicates the correction target region as noise pixel data to noise correction portion 260. Detection area extension processing portions 309G and 309B only differ in the handled data from and are identical in function to detection area extension processing portion 309R so that the description thereof will not be repeated here.

Figure 11:
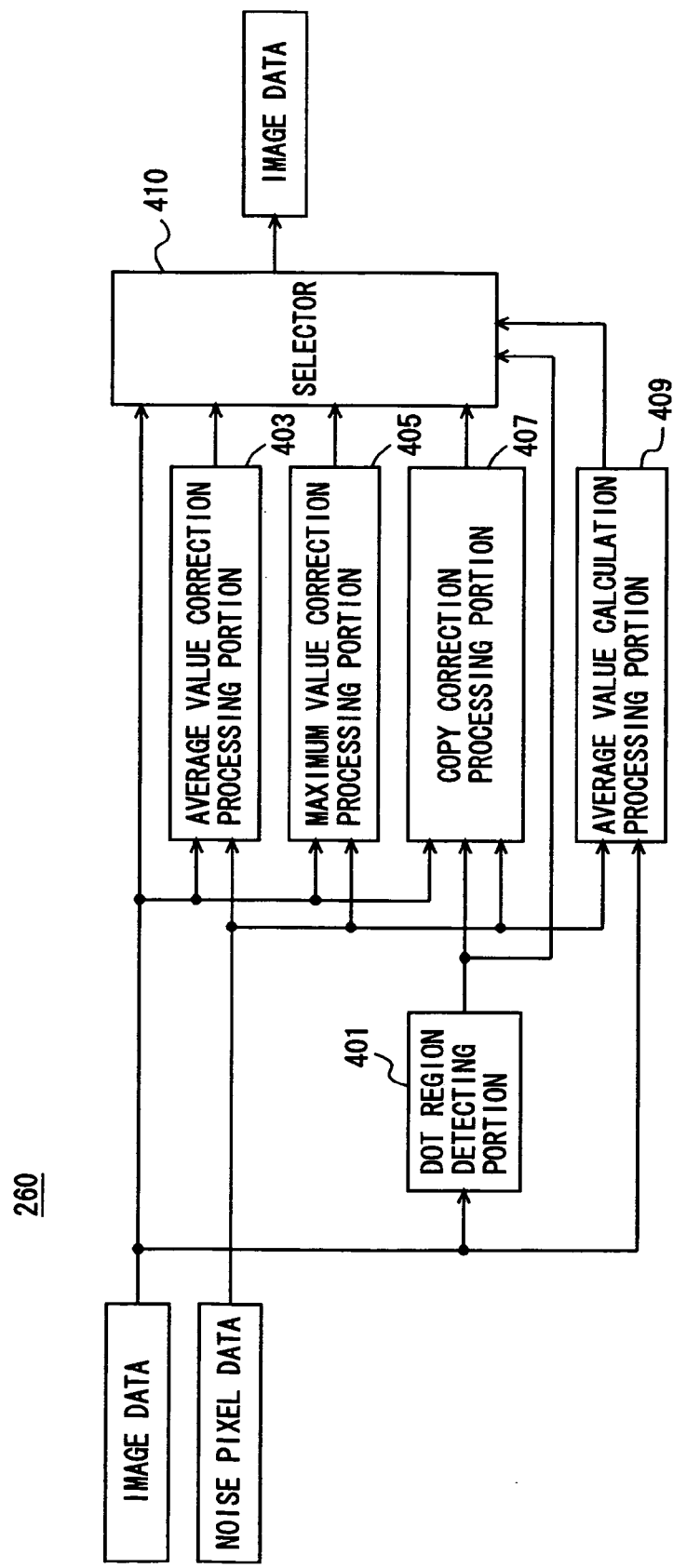
FIG. 11 is a block diagram showing an arrangement of a noise correction portion of the image processing portion according to this embodiment.

FIG. 11 is a block diagram showing an arrangement of the noise correction portion of the image processing portion according to this embodiment. With reference to FIG. 11, noise correction portion 260 receives input of R data, G data, and B data from chromatic aberration correction portion 257 and input of noise pixel data corresponding to each of R data, G data, and B data from noise detection processing portion 259. Noise correction portion 260 executes the same processing with each of R data, G data, and B data inputted from chromatic aberration correction portion 257. Therefore, the case in which noise correction portion 260 processes the R data will be described here. Hereinafter, a reference simply made to image data signifies the R data, and a reference made to noise pixel data indicates the logical data corresponding to the R data outputted by detection area extension processing portion 309R.

Noise correction portion 260 includes a dot region detecting portion 401 to detect a dot region from image data, an average value calculation processing portion 409 to calculate an average value of the pixel values of a plurality of pixels in the vicinity of a pixel which is regarded as an edge pixel in noise pixel data, an average value correction processing portion 403 to substitute the pixel value of the pixel which is regarded as an edge pixel in the noise pixel data with the average value of the pixel values of the plurality of pixels in the vicinity, a maximum value correction processing portion 405 to substitute the pixel value of the pixel which is regarded as an edge pixel in the noise pixel data with the maximum value of the pixel values of the plurality of pixels in the vicinity, a copy correction processing portion 407 to substitute the pixel value of the pixel which is regarded as an edge pixel in the noise pixel data with a pixel value of a pixel included in a dot region in the vicinity, and a selector 410.

Image data is inputted from chromatic aberration correction portion 257 to dot region detecting portion 401. Dot region detecting portion 401 detects a dot region from the image data and outputs to copy correction processing portion 407 and selector 410 dot region data that indicates the pixel value of a pixel included in the dot region as "1" and the pixel value of a pixel not included in the dot region as "0." The details of dot region detecting portion 401 will be described later.

Image data and noise pixel data are inputted to average value calculation processing portion 409. Average value calculation processing portion 409 regards a pixel having a pixel value of "1" in the noise pixel data as a processing target pixel, and calculates the average value of pixel values of image data formed of a plurality of pixels which are in the vicinity of the processing target pixel and each of which has a pixel value of "0" in the noise pixel data. The plurality of pixels in the vicinity need only be greater in number than the number of pixels in the vicinity used for calculating an average value in average value correction processing portion 403 described below, and can be a twelve-by-twelve region having twelve pixels respectively in vertical and horizontal directions with the processing target pixel at the center, for instance. Average value calculation processing portion 409 outputs to selector 410 average value data that sets the pixel value of the processing target pixel as the calculated average value. Average value calculation processing portion 409 sets the pixel value of a pixel that was not selected as the processing target pixel to a value other than a possible value of lightness, for instance, to a negative number. In other words, the pixel which is set to take a negative value in the average value data indicates a pixel which was not regarded as an edge pixel in noise pixel data.

Image data and noise pixel data are inputted to average value correction processing portion 403. Average value correction processing portion 403 regards a pixel having a pixel value of "1" in the noise pixel data as a processing target pixel, and calculates the average value of pixel values of image data formed of a plurality of pixels which are in the vicinity of the processing target pixel and each of which has a pixel value of "0" in the noise pixel data. The plurality of pixels in the vicinity can be a 9-by-9 region having nine pixels respectively in vertical and horizontal directions with the processing target pixel at the center, for instance. Average value correction processing portion 403 outputs to selector 410 the image data in which the pixel value of the processing target pixel of the image data is substituted with the calculated average value. Hereinafter, the image data in which the pixel value of the processing target pixel of the image data is substituted with an average value by average value correction processing portion 403 is referred to as average value correction data. The noise pixel data has a noise pixel extended to the vicinity by detection area extension processing portion 309R so that average value correction processing portion 403 substitutes the pixel value of the image data included in a noise region formed of a plurality of edge pixels in noise pixel data with the average value of pixel values of image data formed of a plurality of pixels which are in the vicinity of the noise region and each of which has a pixel value of "0" in the noise pixel data.

Image data and noise pixel data are inputted to maximum value correction processing portion 405. Maximum value correction processing portion 405 regards a pixel having a pixel value of "1" in the noise pixel data as a processing target pixel, and calculates the maximum value of a plurality of pixel values of image data formed of a plurality of pixels which are in the vicinity of the processing target pixel and each of which has a pixel value of "0" in the noise pixel data. The plurality of pixels in the vicinity can be a 9-by-9 region having nine pixels respectively in vertical and horizontal directions with the processing target pixel at the center, for instance. Maximum value correction processing portion 405 outputs to selector 410 the image data in which the pixel value of the processing target pixel of the image data is substituted with the calculated maximum value. Hereinafter, the image data in which the pixel value of the processing target pixel of the image data is substituted with a maximum value by maximum value correction processing portion 405 is referred to as maximum value correction data. The noise pixel data has a noise pixel extended to the vicinity by detection area extension processing portion 309R so that maximum value correction processing portion 405 substitutes the pixel value of the image data included in a noise region formed of a plurality of edge pixels in noise pixel data with the maximum value of pixel values of image data formed of a plurality of pixels which are in the vicinity of the noise region and each of which has a pixel value of "0" in the noise pixel data.

Image data, noise pixel data, and dot region data are inputted to copy correction processing portion 407. Copy correction processing portion 407 regards a pixel having a pixel value of "1" in the noise pixel data as a processing target pixel, and substitutes the pixel value of image data corresponding to the processing target pixel with the pixel value of the image data corresponding to a pixel which is in a vicinity of the processing target pixel and which has a pixel value of "1" in the dot region data. The noise pixel data has the range of a noise pixel extended by detection area extension processing portion 309 so that copy correction processing portion 407 substitutes the pixel value of image data included in a noise region formed of a plurality of edge pixels in noise pixel data with the pixel value of image data included in a substitution region which is in a vicinity of the noise region and which is regarded as a dot region in the dot region data. The noise region and the substitution region are congruent. The details of copy correction processing portion 407 will be described later. Hereinafter, the data in which the pixel value of the processing target pixel of image data is substituted with a pixel value of the image data corresponding to a pixel which is in a vicinity of the processing target pixel and which has a pixel value of "1" in the dot region data is referred to as copy correction data.

Selector 410 receives input of image data from chromatic aberration correction portion 257, input of average value correction data from average value correction processing portion 403, input of maximum value correction data from maximum value correction processing portion 405, and input of copy correction data from copy correction processing portion 407. In addition, selector 410 receives input of dot region data from dot region detecting portion 401 and input of average value data from average value calculation processing portion 409. Selector 410 selects and outputs one of the image data, the average value correction data, the maximum value correction data, and the copy correction data based on the dot region data and the average value data.

More specifically, with regard to the processing target pixel whose pixel value in the average value data is negative, selector 410 selects and outputs the image data. This is because the processing target pixel whose pixel value in the average value data is negative indicates data which is not regarded as an edge pixel in noise pixel data. With regard to the processing target pixel whose pixel value in the average value data is not negative, selector 410 selects and outputs one of the average value correction data, the maximum value correction data, and the copy correction data based on the dot region data and the average value data.

In other words, with regard to the processing target pixel whose pixel value in the dot region data is "1," selector 410 selects and outputs the copy correction data. The pixel whose pixel value in the dot region data is "1" is regarded as an edge pixel in noise pixel data, and the region in the vicinity of it is a dot region. Thus, the image quality of the pixel whose pixel value in the dot region data is "1" is enhanced when the image data is substituted with the pixel value of the dot region in the vicinity.

With regard to the processing target pixel whose pixel value in the dot region data is "0" and the average value data exceeds a prescribed threshold value, selector 410 selects and outputs the maximum value correction data. The region in the vicinity of a pixel whose pixel value in the dot region data is "0" and the average value data exceeds a prescribed threshold value is a region having high lightness, and it is highly likely that this region is a background portion of the original document. Thus, the image quality is enhanced when the image data is substituted with the maximum value of pixel values of a plurality of pixels in the vicinity.

With regard to the processing target pixel whose pixel value in the dot region data is "0" and pixel value in the average value data does not exceed a prescribed threshold value, selector 410 selects and outputs the average value correction data. The region in the vicinity of a pixel whose pixel value in the dot region data is "0" and pixel value in the average value data does not exceed a prescribed threshold value is a region not having high lightness, and it is highly likely that it is a region expressed by a middle-tone color. Thus, the image quality is enhanced when the image data is substituted with the average value of pixel values of a plurality of pixels in the vicinity.

Figure 12:
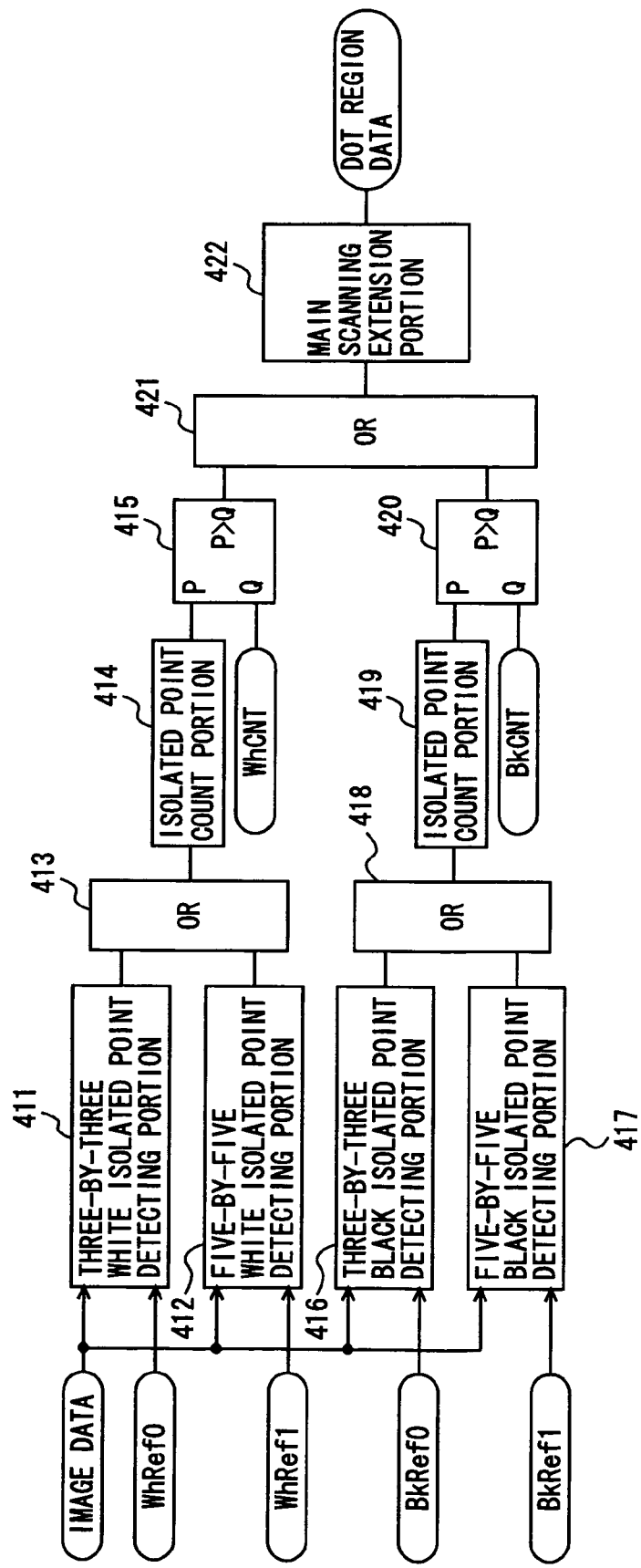
FIG. 12 is a functional block diagram showing an example of a configuration of a dot region detecting portion.

FIG. 12 is a functional block diagram showing an example of a configuration of dot region detecting portion 401. With reference to FIG. 12, dot region detecting portion 401 includes a 3-by-3 white isolated point detecting portion 411, a 5-by-5 white isolated point detecting portion 412, a 3-by-3 black isolated point detecting portion 416, and a 5-by-5 black isolated point detecting portion 417 each for detecting an isolated point from image data, OR elements 413 and 418, isolated point count portions 414 and 419 to count an isolated point included in a region of a prescribed range from a processing target pixel, comparators 415 and 420, an OR element 421, and a main scanning extension portion 422.

3-by-3 white isolated point detecting portion 411 selects a plurality of pixels of image data one by one in turn as a processing target pixel, and detects a center pixel of a white-colored isolated point of a size of one pixel from the image data using a 3-by-3 isolated point detection filter to be described later. 5-by-5 white isolated point detecting portion 412 selects a plurality of pixels of image data one by one in turn as a processing target pixel, and detects a center pixel of a white-colored isolated point of a size of three pixels from the image data using a 5-by-5 isolated point detection filter to be described later. 3-by-3 black isolated point detecting portion 416 selects a plurality of pixels of image data one by one in turn as a processing target pixel, and detects a center pixel of a black-colored isolated point of a size of one pixel from the image data using the 3-by-3 isolated point detection filter to be described later. 5-by-5 black isolated point detecting portion 417 selects a plurality of pixels of image data one by one in turn as a processing target pixel, and detects a center pixel of a black-colored isolated point of a size of three pixels from the image data using the 5-by-5 isolated point detection filter to be described later.

Figures 13A, 13B:
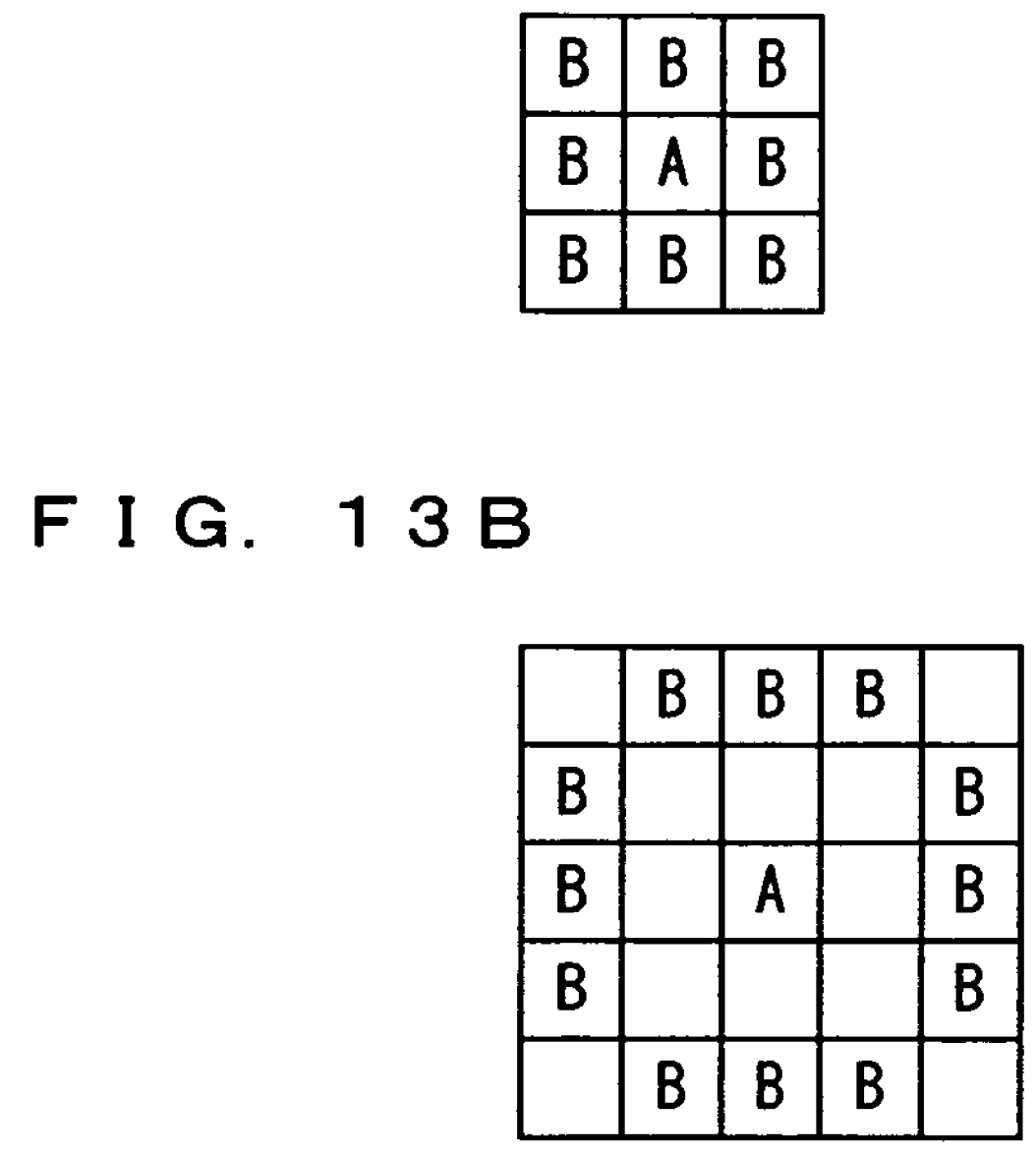

FIGS. 13A and 13B are diagrams each showing an example of an isolated point detection filter. In the drawing, the pixel denoted by the reference character A is a processing target pixel. FIG. 13A shows a 3-by-3 isolated point detection filter. The 3-by-3 isolated point detection filter is used for detecting an isolated point whose size is one pixel. The conditions to be satisfied by uing the 3-by-3 isolated point detection filter are as follows.

(Condition B1) The condition that detects a white-colored isolated point is that the difference between the pixel value of a processing target pixel A and the maximum value of pixel values of a plurality of pixels B in the vicinity is greater than a threshold value WhRef0. If a pixel value of each pixel is indicated by reference characters, the condition can be represented by the following expression:

$A-\mathrm{MAX}(B) > \mathrm{WhRef0}$ where MAX(B) indicates the maximum value of a plurality of pixels B.

(Condition B2) The condition that detects a black-colored isolated point is that the difference between the minimum value of pixel values of a plurality of pixels B in the vicinity of processing target pixel A and the pixel value of processing target pixel A is greater than a threshold value BkRef0. If a pixel value of each pixel is indicated by reference characters, the condition can be represented by the following expression:

$\mathrm{MIN}(B)-A > \mathrm{BkRef0}$ where MIN(B) indicates the minimum value of a plurality of pixels B.

FIG. 13B shows a 5-by-5 isolated point detection filter. The 5-by-5 isolated point detection filter is used for detecting an isolated point whose size is three pixels. The conditions to be satisfied by establishing the 5-by-5 isolated point detection filter are as follows.

(Condition B3) The condition that detects a white-colored isolated point is that the difference between the pixel value of processing target pixel A and the maximum value of pixel values of a plurality of pixels B in the vicinity is greater than a threshold value WhRef1. If a pixel value of each pixel is indicated by reference characters, the condition can be represented by the following expression:

$A-\mathrm{MAX}(B) > \mathrm{WhRef1}$ where MAX(B) indicates the maximum value of a plurality of pixels B.

(Condition B4) The condition that detects a black-colored isolated point is that the difference between the minimum value of pixel values of a plurality of pixels B in the vicinity of processing target pixel A and the pixel value of processing target pixel A is greater than a threshold value BkRef1. If a pixel value of each pixel is indicated by reference characters, the condition can be represented by the following expression:

$\mathrm{MIN}(B)-A > \mathrm{BkRef1}$ where MIN(B) indicates the minimum value of a plurality of pixels B.

Moreover, although the isolated point detection filters for detecting the isolated points whose sizes are one pixel and three pixels here, needless to say, an isolated point detection filter for detecting an isolated point whose size is larger than five pixels can be used.

Going back to FIG. 12, 3-by-3 white isolated point detecting portion 411 outputs to OR element 413 logical data in which processing target pixel A is determined to be the center pixel of a 3-by-3 white isolated point and the pixel value of the processing target pixel is set as "1" if the processing target pixel satisfies the condition B1, and the pixel value of processing target pixel A is set as "0" if the processing target pixel does not satisfy the condition B1 using the 3-by-3 isolated point detection filter shown in FIG. 13A. 5-by-5 white isolated point detecting portion 412 outputs to OR element 413 logical data in which processing target pixel A is determined to be the center pixel of a 5-by-5 white isolated point and the pixel value of the processing target pixel is set as "1" if the processing target pixel satisfies the condition B3, and the pixel value of processing target pixel A is set as "0" if the processing target pixel does not satisfy the condition B3 using the 5-by-5 isolated point detection filter shown in FIG. 13B.

3-by-3 black isolated point detecting portion 416 outputs to OR element 418 logical data in which processing target pixel A is determined to be the center pixel of a 3-by-3 black isolated point and the pixel value of the processing target pixel is set as "1" if the processing target pixel satisfies the condition B2, and the pixel value of processing target pixel A is set as "0" if the processing target pixel does not satisfy the condition B2 using the 3-by-3 isolated point detection filter shown in FIG. 13A. 5-by-5 black isolated point detecting portion 417 outputs to OR element 418 logical data in which processing target pixel A is determined to be the center pixel of a 5-by-5 black isolated point and the pixel value of the processing target pixel is set as "1" if the processing target pixel satisfies the condition B4, and the pixel value of processing target pixel A is set as "0" if the processing target pixel does not satisfy the condition B4 using the 5-by-5 isolated point detection filter shown in FIG. 13B.

The logical data respectively outputted by 3-by-3 white isolated point detecting portion 411 and 5-by-5 white isolated point detecting portion 412 are inputted to OR element 413. OR element 413 calculates for each pixel an OR of the two inputted logical data and outputs the calculated OR data to isolated point count portion 414. A pixel whose pixel value in the OR data is "1" indicates the center pixel of a white-colored isolated point having a size of any one of one to three pixels. Isolated point count portion 414 counts a number of pixels whose pixel value in the OR data are "1" in a region of a prescribed range from the processing target pixel using the OR data inputted from OR element 413. The region of the prescribed range should be a region of a predetermined range. In addition, the region of the prescribed range can be determined by the size of the dot (isolated point) detected. Isolated point count portion 414 outputs to comparator 415 count data in which the pixel value is set to the number of pixels whose pixel value in the OR data are "1" in a region of a prescribed range from the processing target pixel. The count data is inputted from isolated point count portion 414 to comparator 415. Comparator 415 compares the count data with a threshold value WhCNT for each pixel. Comparator 415 outputs to OR element 421 logical data in which the pixel value is set to "1" if the pixel value of the processing target pixel is greater than threshold value WhCNT in the count data and the pixel value is set to "0" if the pixel value of the processing target pixel is not greater than threshold value WhCNT. In the logical data outputted by comparator 415, the pixel for which the pixel value is set to "1" indicates that it is a pixel included in a dot region. This is because, in the dot region, isolated points that exceeds a prescribed number in number exist in the region of a prescribed range.

The logical data respectively outputted by 3-by-3 black isolated point detecting portion 416 and 5-by-5 black isolated point detecting portion 417 are inputted to OR element 418. OR element 418 calculates for each pixel an OR of the two inputted logical data and outputs the calculated OR data to isolated point count portion 419. A pixel whose pixel value in the OR data is "1" indicates the center pixel of a black-colored isolated point having a size of any one of one to three pixels. Isolated point count portion 419 counts a number of pixels whose OR data are "1" in a region of a prescribed range from the processing target pixel using the OR data inputted from OR element 418. The region of the prescribed range should be a region of a predetermined range. In addition, the region of the prescribed range can be determined by the size of the dot (isolated point) detected. Isolated point count portion 419 outputs to comparator 420 count data in which the pixel value is set to the number of pixels whose pixel value in the OR data are "1" in a region of a prescribed range from the processing target pixel. The count data is inputted from isolated point count portion 419 to comparator 420. Comparator 420 compares the count data with a threshold value BkCNT for each pixel. Comparator 420 outputs to OR element 421 logical data in which the pixel value is set to "1" if the pixel value of the processing target pixel is greater than threshold value BkCNT in the count data and the pixel value is set to "0" if the pixel value of the processing target pixel is not greater than threshold value BkCNT. In the logical data outputted by comparator 420, the pixel for which the pixel value is set to "1" indicates that it is a pixel included in a dot region.

The logical data in which a pixel included in a dot region is set to "1" are inputted from each of comparators 415 and 420 to OR element 421. The OR element 421 calculates an OR of the two logical data for each pixel and outputs the calculated OR data to main scanning extension portion 422. Main scanning extension portion 422 generates and outputs to copy correction processing portion 407 and selector 410 dot region data in which the range of a pixel whose pixel value is set to "1" in the inputted OR data is extended by a prescribed range in the main scanning direction. More specifically, the pixel value of a pixel whose pixel value is "0" and which is adjacent to a pixel whose pixel value is "1" is changed to "1" in the OR data. The dot region data is the logical data in which the pixel value of a pixel included in the dot region is set to "1" and the pixel value of a pixel not included in the dot region is set to "0."

Figure 14:
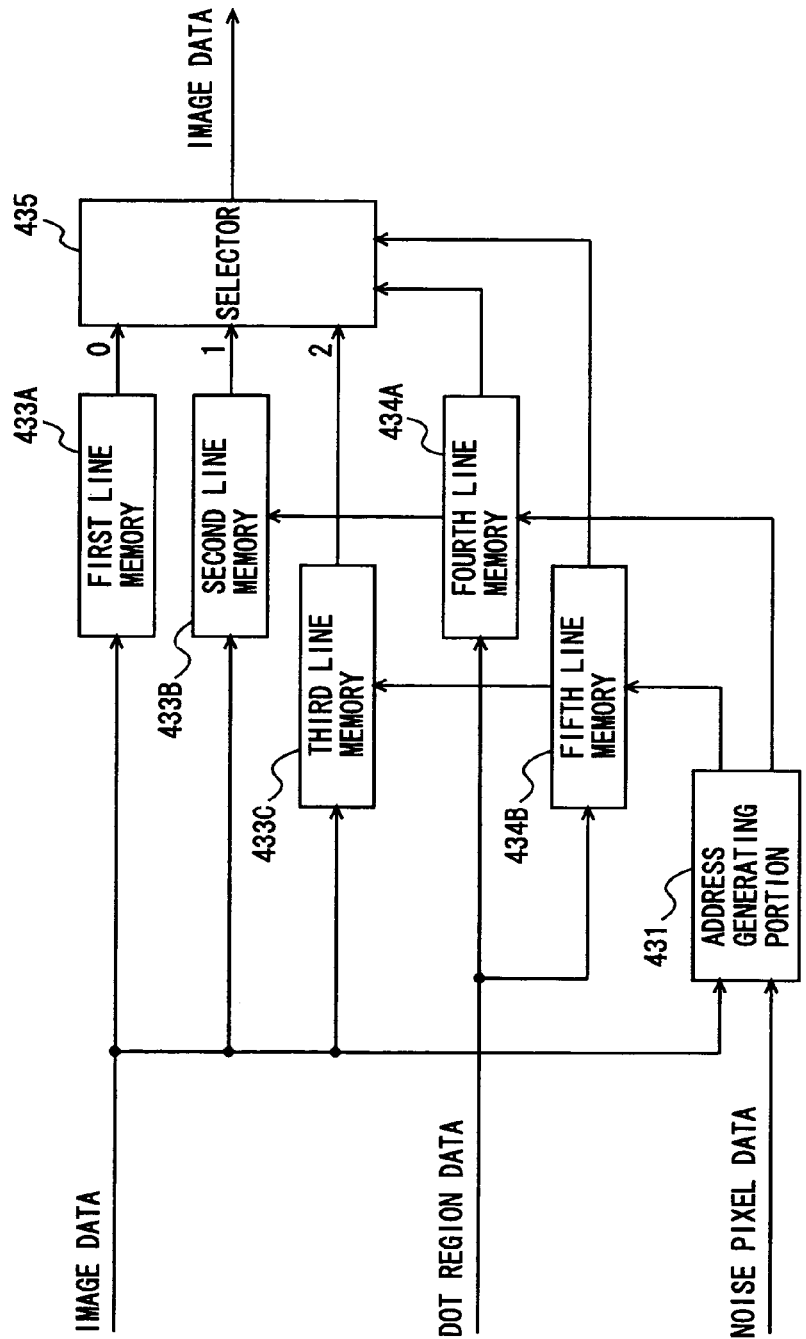
FIG. 14 is a functional block diagram showing an example of a configuration of a copy correction processing portion.

FIG. 14 is a functional block diagram showing an example of a configuration of the copy correction processing portion. With reference to FIG. 14, copy correction processing portion 407 includes an address generating portion 431 for specifying a pixel for substituting the pixel value of image data of a pixel whose pixel value is set to "1" in the noise pixel data, a first line memory 433A, a second line memory 433B, and a third line memory 433C each for storing image data one line, a fourth line memory 434A and a fifth line memory 434B for storing dot region data corresponding to one line, and a selector 435.

The image data corresponding to one line stored in first line memory 433A, the image data corresponding to one line stored in second line memory 433B, and the image data corresponding to one line stored in third line memory 433C are of the same line. The dot region data corresponding to one line stored in fourth line memory 434A and the dot region data corresponding to one line stored in fifth line memory 434B are of the same line. Moreover, the dot region data corresponding to one line respectively stored in fourth line memory 434A and fifth line memory 434B are of the same line as the image data corresponding to one line respectively stored in first line memory 433A, second line memory 433B, and third line memory 433C.

Image data and noise pixel data are inputted to address generating portion 431. Address generating portion 431 selects a plurality of pixels included in the noise pixel data one by one in turn and regards the pixel whose pixel value is "1" as a processing target pixel, and specifies a substitution pixel for substituting the pixel value of image data corresponding to the processing target pixel. The noise pixel data is data corresponding to one line in which pixel values are aligned in the main scanning direction so that the substitution pixel may exist in two directions with reference to the processing target pixel. Thus, address generating portion 431 specifies a first substitution pixel that exists on one side and a second substitution pixel that exists on the other side with reference to the processing target pixel. Address generating portion 431 selects a plurality of pixels included in the noise pixel data one by one in turn, and with a pixel whose pixel value is "0," outputs an address of the pixel to second line memory 433B, third line memory 433C, fourth line memory 434A, and fifth line memory 434B. Address generating portion 431 selects a plurality of pixels included in the noise pixel data one by one in turn, and with a pixel whose pixel value is set to "1," outputs an address of the first substitution pixel to second line memory 433B and fourth line memory 434A, and outputs an address of the second substitution pixel to third line memory 433C and fifth line memory 434B. Here, the address indicates the position of a pixel in the main scanning direction.

Each of first line memory 433A, second line memory 433B, and third line memory 433C outputs a pixel value pixel by pixel to selector 435. First line memory 433A is a FIFO (First In First Out) that outputs a pixel value in the order in which the pixel value of image data inputted is inputted. Each of second line memory 433B and third line memory 433C outputs to selector 435 a pixel value of the pixel specified by the address inputted from address generating portion 431. In other words, with a pixel whose pixel value is "0" in the noise pixel data, second line memory 433B outputs the pixel value of a pixel of image data corresponding to that pixel, and with a pixel whose pixel value is "1" in the noise pixel data, outputs the pixel value of image data corresponding to the first substitution pixel. With a pixel whose pixel value is "0" in the noise pixel data, third line memory 433C outputs the pixel value of a pixel of image data corresponding to that pixel, and with a pixel whose pixel value is "1" in the noise pixel data, outputs the pixel value of image data corresponding to the second substitution pixel.

Each of fourth line memory 434A and fifth line memory 434B outputs to selector 435 a pixel value of the pixel specified by the address inputted from address generating portion 431. In other words, with a pixel whose pixel value is "0" in the noise pixel data, fourth line memory 434A outputs the pixel value of a pixel of dot region data corresponding to that pixel, and with a pixel whose pixel value is "1" in the noise pixel data, outputs the pixel value of dot region data corresponding to the first substitution pixel. With a pixel whose pixel value is "0" in the noise pixel data, fifth line memory 434B outputs the pixel value of a pixel of dot region data corresponding to that pixel, and with a pixel whose pixel value is "1" in the noise pixel data, outputs the pixel value of dot region data corresponding to the second substitution pixel.

The pixel values of pixels in the same position in the main scanning direction of image data are inputted at the same time from first line memory 433A, second line memory 433B, and third line memory 433C to selector 435. Here, the pixel value inputted from first line memory 433A is referred to as an input 0, the pixel value inputted from second line memory 433B is referred to as an input 1, and the pixel value inputted from third line memory 433C is referred to as an input 2. Moreover, the pixel values of pixels in the same position in the main scanning direction of dot region data are inputted at the same time from fourth line memory 434A and fifth line memory 434B to selector 435. Based on the pixel values of the pixels in the same position in the main scanning direction of the dot region data inputted from fourth line memory 434A and fifth line memory 434B, selector 435 selects one of the pixel values of the pixels in the same position in the main scanning direction of the image data inputted from first line memory 433A, second line memory 433B, and third line memory 433C and outputs the pixel value of the image data selected.

Figures 15, 16:
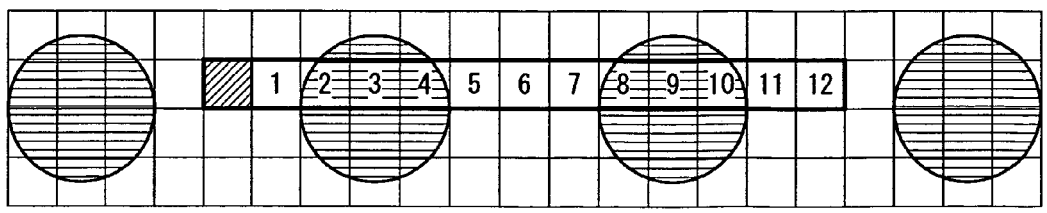
FIG. 15 is a diagram showing a condition for a selector to select image data.
FIG. 16 is a diagram for illustrating a process by which an address generating portion decides a first substitution pixel.

FIG. 15 is a diagram showing a condition for the selector to select image data. In FIG. 15, for each of the four combinations of the pixel values of the pixels in the same position in the main scanning direction of the dot region data inputted from fourth line memory 434A and fifth line memory 434B, the input to be selected is made to correspond to a selector output. When the pixel value of the dot region data inputted from fourth line memory 434A is "0" and the pixel value of the dot region data inputted from fifth line memory 434B is "0," selector 435 outputs the input 0, that is, the pixel value of the image data inputted from first line memory 433A. When the pixel value of the dot region data inputted from fourth line memory 434A is "0" and the pixel value of the dot region data inputted from fifth line memory 434B is "1," selector 435 outputs the input 2, that is, the pixel value of the image data inputted from third line memory 433C. When the pixel value of the dot region data inputted from fourth line memory 434A is "1" and the pixel value of the dot region data inputted from fifth line memory 434B is "0," selector 435 outputs the input 1, that is, the pixel value of the image data inputted from second line memory 433B. When the pixel value of the dot region data inputted from fourth line memory 434A is "1" and the pixel value of the dot region data inputted from fifth line memory 434B is "1," selector 435 outputs the input 1, that is, the pixel value of the image data inputted from second line memory 433B.

In this manner, selector 435 outputs image data in which the pixel value of image data corresponding to a pixel which is regarded as an edge pixel in the noise pixel data is substituted with the pixel value of image data corresponding to a pixel of a dot region and in a vicinity of the edge pixel. Moreover, selector 435 can be configured such that it outputs the input 2, that is, the pixel value of image data inputted from third line memory 433C when the pixel value of dot region data inputted from fourth line memory 434A is "1" and the pixel value of dot region data inputted from fifth line memory 434B is "1."

Next, the process by which address generating portion 431 decides a first substitution pixel and a second substitution pixel will be described. The first substitution pixel and the second substitution pixel only differ in the direction in which they are located in the main scanning direction in relation to an edge pixel so that the process of deciding the first substitution pixel will be described here. FIG. 16 is a diagram for illustrating the process by which address generating portion 431 decides the first substitution pixel. FIG. 16 shows binary data in which image data is binarized, where one pixel is indicated by one square, and four of the isolated points of a size of three pixels are shown. In addition, for ease of description, pixels are denoted by numbers 1 through 12, and the pixel shown by diagonal hatching indicates an edge pixel. Moreover, the edge pixel is a pixel whose value is set to "1" in the noise pixel data. Here, the process of specifying a first substitution pixel that exists toward the right from the edge pixel will be described.

First, the edge pixel is regarded as the pixel of interest, and a pixel 1 on the right side of in the main scanning direction and contacting the pixel of interest is regarded as a reference pixel. The color of the reference pixel is determined. The reason for determining the color of the reference pixel is because the color of the edge pixel is not one that can be determined by scanning the original document. Here, pixel 1 is white in color. Then, until the following conditions are satisfied, the pixels that continue successively toward the right of the reference pixel are one by one in turn set as the processing target pixel.

(Condition C1) When the number of white pixels and the number of black pixels are counted among the pixels from the reference pixel (pixel 1) on the right side of in the main scanning direction and contacting the pixel of interest up to the processing target pixel, the number of white pixels and the number of black pixels must be equal.

(Condition C2) At least one of the processing target pixel and the pixel on the right side of in the main scanning direction and contacting the processing target pixel must be of the same color as the reference pixel (pixel 1).

Here, when a pixel 2 is the processing target pixel, condition C1 is satisfied but condition C2 is not satisfied. When a pixel 6 is the processing target pixel, both condition C1 and condition C2 are satisfied. Therefore, pixel 6 is specified as the first substitution pixel in this example.

In the case where an edge pixel is isolated and does not continue in the main scanning direction in the noise pixel data, the edge pixel can be regarded as the pixel of interest. In the case where a plurality of edge pixels continue successively in the main scanning direction in the noise pixel data, the rightmost edge pixel of the plurality of successive edge pixels becomes the pixel of interest for finding the first substitution pixel. When the number of pixels that lie between the pixel of interest and the first substitution pixel found is smaller than the number of the plurality of successive edge pixels, it is necessary to set the first substitution pixel further toward the right. This is because the number of pixels of the dot region for substituting the edge pixels would be insufficient. In this case, a pixel 12 which lies further toward the right from pixel 6 specified in the above example and which satisfies condition C1 and condition C2 described above would be specified as the first substitution pixel. Moreover, in the case where a plurality of edge pixels continue successively in the main scanning direction in the noise pixel data, the leftmost edge pixel of the plurality of successive edge pixels becomes the pixel of interest for finding the second substitution pixel.

Figure 17A:
FIGS. 17A to 17E are other diagrams for illustrating the process by which the address generating portion decides the first substitution pixel.
Figure 17B:
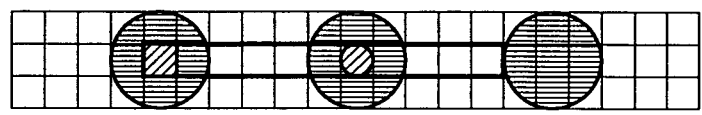
Figure 17C:
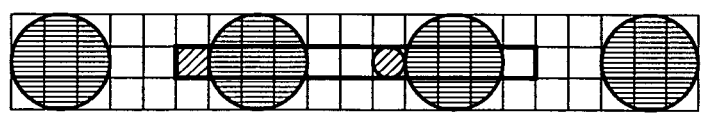
Figure 17D:
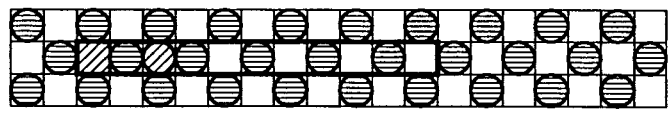
Figure 17E:
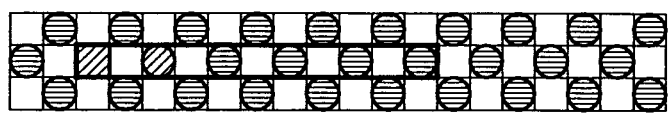

FIGS. 17A to 17E are other diagrams for illustrating the process by which address generating portion 431 decides the first substitution pixel. In the drawing, a rectangular pixel shown with hatching indicates a pixel of interest, and a circular pixel shown with hatching of diagonal lines slanting downward to the left indicates a first substitution pixel. In FIGS. 17A and 17B, of condition C1 and condition C2 described above, the first substitution pixel can be decided only by the condition that the color of a processing target pixel and the color of a reference pixel be the same. In FIGS. 17C to 17E, however, condition C1 and condition C2 of the color of a processing target pixel being the same as the color of a reference pixel are never established. Thus, the above condition C2 includes the condition that the color of a pixel to the immediate right of a processing target pixel be the same as the color of the reference pixel.

Figure 18:
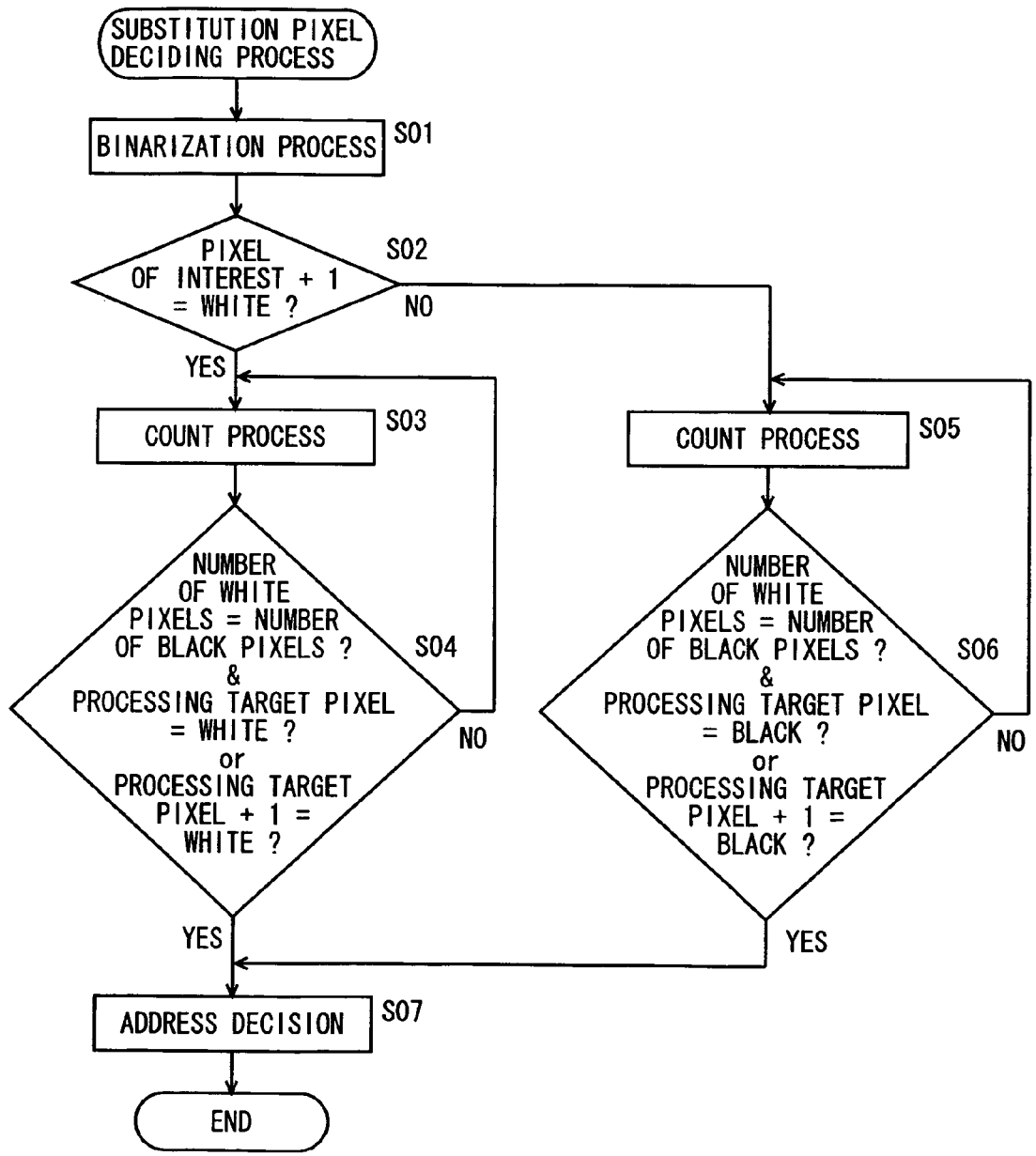
FIG. 18 is a flow chart showing an example of a flow of a substitution pixel deciding process executed by the address generating portion.

FIG. 18 is a flow chart showing an example of a flow of a substitution pixel deciding process executed by address generating portion 431. Here, the flow of the process of deciding the first substitution pixel is shown. With reference to FIG. 18, address generating portion 431 binarizes the inputted image data (step S01). Here, the binarized image data is referred to as binary data. Binary data is data whose pixel color is white or black. Then, it is determined whether the color of a reference pixel to the immediate right of a pixel of interest which is an edge pixel is white or not (step S02). In the drawing, the direction to the right of the pixel of interest is considered to be positive, and the reference pixel on the right side of and contacting the pixel of interest is indicated as pixel of interest+1. Address generating portion 431 regards the reference pixel on the right side of and contacting the pixel of interest as the processing target pixel. In address generating portion 431, the process proceeds to step S03 if the reference pixel on the right side of and contacting the pixel of interest is white in color, and the process proceeds to step S05 if it is black in color.

Next, address generating portion 431 regards the pixel on the right side of and contacting the processing target pixel as the new processing target pixel, and counts the number of white-colored pixels and the number of black-colored pixels among a plurality of pixels that exist from the reference pixel (pixel of interest+1) on the right side of and contacting the pixel of interest up to the processing target pixel (step S03). Then, address generating portion 431 determines if the number of white-colored pixels and the number of black-colored pixels are equal and whether either of the processing target pixel or, the pixel on the right side of and contacting the processing target pixel is white or not (step S04). In address generating portion 431, the process proceeds to step S07 if YES, and the process goes back to step S03 if NO. In step S07, address generating portion 431 decides the address that indicates the position of the processing target pixel in the main scanning direction as the address of the first substitution pixel.

In the case where a plurality of edge pixels continue successively in the main scanning direction, the rightmost edge pixel among the plurality of successive edge pixels was to be the pixel of interest. The address decided in step S07 is the address of the pixel of interest so that it decides the respective addresses of all the edge pixels that continue successively on the left side of the pixel of interest. For instance, the address of the edge pixel on the left side of and contacting the pixel of interest becomes the address of the pixel on the left side of and contacting the first substitution pixel corresponding to the pixel of interest.

On the other hand, in the case where the process proceeds to step S05, the reference pixel (pixel of interest+1) on the right side of and contacting the pixel of interest is black in color. In step S05, address generating portion 431 regards the pixel on the right side of and contacting the processing target pixel as the new processing target pixel, and counts the number of white-colored pixels and the number of black-colored pixels among a plurality of pixels that exist from the reference pixel (pixel of interest+1) on the right side of and contacting the pixel of interest up to the processing target pixel. Then, address generating portion 431 determines if the number of white-colored pixels and the number of black-colored pixels are equal and whether either of the processing target pixel or the pixel on the right side of and contacting the processing target pixel is black or not (step S06). In address generating portion 431, the process proceeds to step S07 if YES, and the process goes back to step S05 if NO. In step S07, address generating portion 431 decides the address that indicates the position of the processing target pixel in the main scanning direction as the address of the first substitution pixel.

In this manner, address generating portion 431 decides a first substitution pixel separated by an appropriate distance according to the size of a dot (isolated point) of a region for an edge pixel. Consequently, when copy correction processing portion 407 substitutes the pixel value of the edge pixel with a pixel value of the first substitution pixel or the second substitution pixel, the regularity of the isolated point is maintained so that the noise becomes inconspicuous and the image quality is enhanced. In addition, in the case where a plurality of edge pixels continue successively in the main scanning direction, address generating portion 431 regards the rightmost edge pixel of the plurality of edge pixels that continue successively in the main scanning direction as the pixel of interest, and decides the respective addresses of all the edge pixels that continue successively on the left side of the pixel of interest so that, for an edge region including the plurality of edge pixels that continue successively in the main scanning direction, it decides a substitution region which is congruent with the edge region and which is separated by an appropriate distance according to the size of a dot (isolated point) of a region. Thus, when copy correction processing portion 407 substitutes the pixel value of a noise region with a pixel value of the substitution region, the regularity of the isolated point is maintained so that the noise becomes inconspicuous and the image quality is enhanced.

Moreover, the process of deciding a second substitution pixel only differs from the process of deciding the first substitution pixel in the direction in which the pixels are scanned so that the description thereof will not be repeated.

Figure 19:
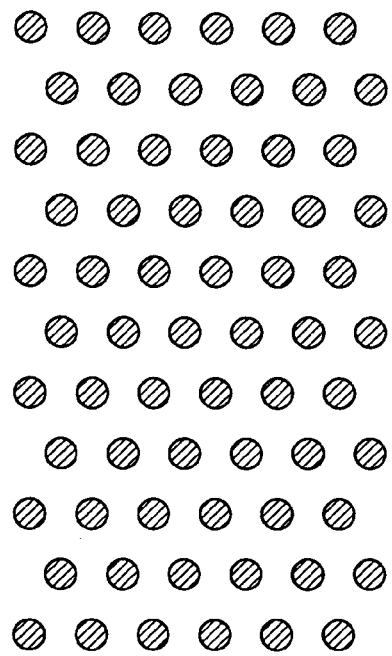
FIG. 19 is a diagram showing a dot region of image data obtained by scanning an original document.
Figure 20:
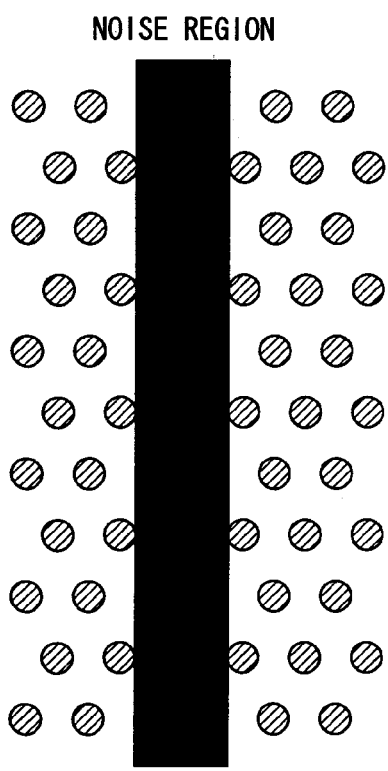
FIG. 20 is a diagram showing the dot region of the image data obtained by scanning the original document with the presence of a black-colored foreign object stuck on the copyboard.
Figure 21:
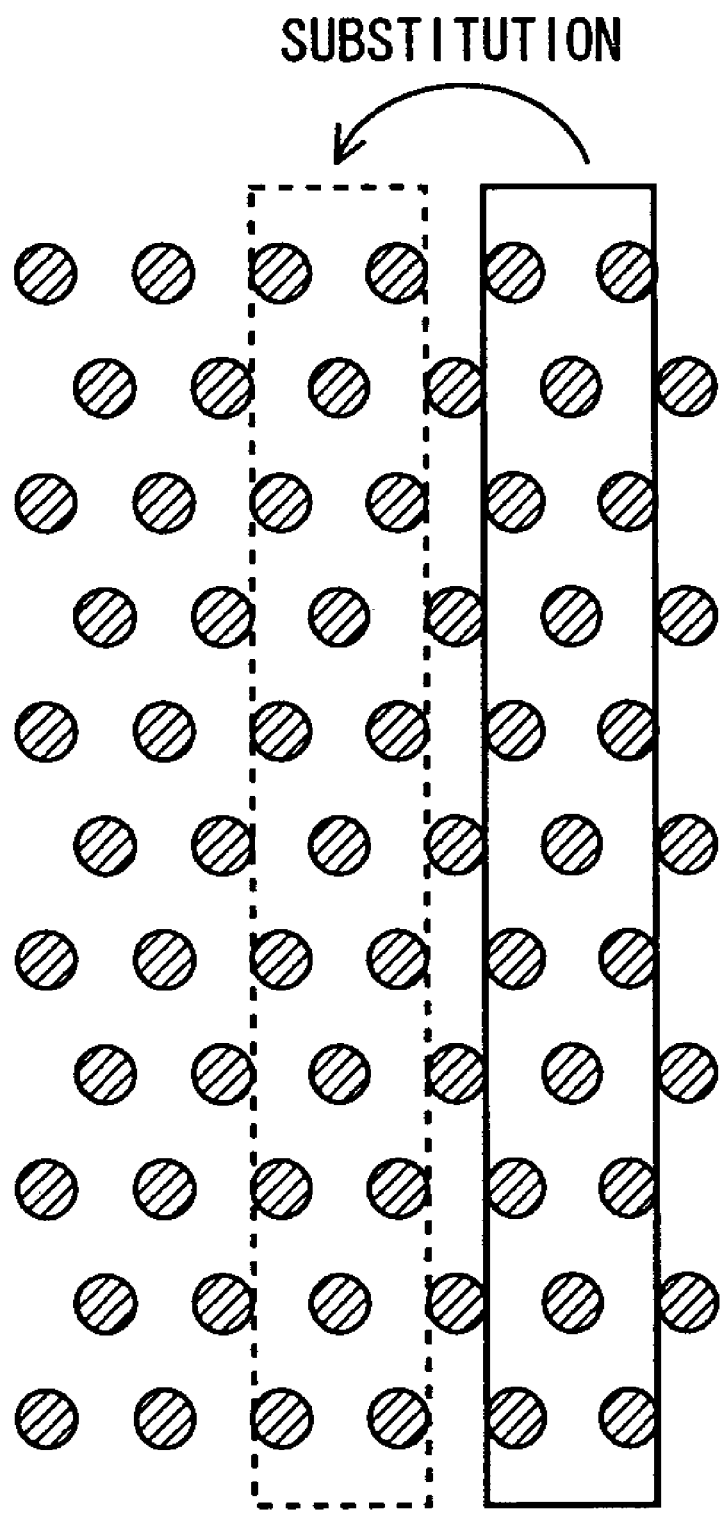
FIG. 21 is a diagram showing image data after a noise is removed from the dot region by the MFP according to this embodiment.

FIG. 19 is a diagram showing a dot region of image data obtained by scanning an original document. FIG. 20 is a diagram showing the dot region of the image data obtained by scanning the original document with the presence of a black-colored foreign object stuck on the copyboard. When FIG. 19 and FIG. 20 are compared, a streak of noise of black color is included within the dot region caused by the scanning of a black-colored foreign object stuck on the copyboard. FIG. 21 is a diagram showing the image data after the noise is removed from the dot region by the MFP according to this embodiment. As shown in FIG. 21, the dot region of the image data similar to that in FIG. 19 is reproduced.

As described above, MFP 100 according to this embodiment obtains image data by scanning an original document with image scanning apparatus 10, detects a noise from the image data with noise detection processing portion 259, detects a dot region from the image data with dot region detecting portion 401, and when a region in the vicinity of a noise region including the noise detected by noise detection processing portion 259 is included in the dot region detected by dot region detecting portion 401, substitutes the noise region with a substitution region of the same size as the noise region and located in the vicinity of the noise region with copy correction processing portion 407. Since the noise region is substituted with the dot region in the vicinity, the deterioration of the image quality can be prevented. As a result, the quality of an image after a noise is removed from a dot region of image data obtained by scanning an original document can be enhanced.

In addition, selector 410 of MFP 100 selects and outputs a pixel value outputted by copy correction processing portion 407 when a dot region is detected from the image data by dot region detecting portion 401, selects and outputs a pixel value outputted by maximum value correction processing portion 405 when a dot region is not detected from the image data by dot region detecting portion 401 and an average value calculated by average value calculation processing portion 409 exceeds a prescribed value, and selects and outputs a pixel value outputted by average value correction processing portion 403 when a dot region is not detected from the image data by dot region detecting portion 401 and an average value calculated by average value calculation processing portion 409 does not exceed a prescribed value. Copy correction processing portion 407 substitutes a pixel value included in a noise region with a pixel value included in a substitution region of the same size as the noise region and located in the vicinity of the noise region, average value correction processing portion 403 substitutes a pixel value of a pixel included in the noise region with an average value of pixel values of a plurality of pixels located in the vicinity of the noise region, and maximum value correction processing portion 405 substitutes a pixel value of a pixel included in the noise region with the maximum value of pixel values of a plurality of pixels located in the vicinity of the noise region.

If a pixel value of a pixel included in a region of dots is substituted with the maximum value or the average value of a plurality of pixels of vicinity pixels, for instance, a region not including dots would exist within the region of dots so that a noise becomes conspicuous and the image quality deteriorates. On the other hand, if a pixel included in the region of dots is substituted with a pixel of a region of dots in the vicinity, a dot would exist within the region of dots so that the noise is inconspicuous. A region of high lightness within a region with white-colored background is inconspicuous, and a middle tone region within a middle tone region is inconspicuous. MFP 100 changes the pixel value with which to substitute a pixel of the noise region depending on the region in the vicinity of the noise region so that the quality of the image after the noise is removed can be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   an image data obtaining portion to obtain image data by scanning an original document;
   a noise detecting portion to detect a noise from the obtained image data;
   a dot region detecting portion to detect a region of dots from said obtained image data; and
   a substituting portion to substitute a noise region with a substitution region that is located in a vicinity of said noise region and that is of a same size as said noise region if a region in a vicinity of said noise region including the noise detected by said noise detecting portion is included in the region of dots detected by said dot region detecting portion.

2. The image processing apparatus according to claim 1, wherein said substituting portion includes a substitution region deciding portion to decide a distance between said noise region and said substitution region based on a size of a dot in a region in a vicinity of said noise region if the region in the vicinity of said noise region including the noise detected by said noise detecting portion is included in the region of dots detected by said dot region detecting portion.

3. The image processing apparatus according to claim 2, wherein said substitution region deciding portion includes
   a binarization portion to binarize said obtained image data into a white-colored pixel and a black-colored pixel, and
   said substitution region deciding portion decides a second pixel where the number of white-colored pixels and the number of black-colored pixels are equal among a plurality of pixels that continue successively in a main scanning direction and having at one end a first pixel contacting said noise region on the substitution region side and at other end said second pixel which is included in said substitution region and which is located farthest away from said noise region, and where at least one of said second pixel and a third pixel contacting said second pixel on opposite side of said first pixel is of same color as said first pixel.

4. The image processing apparatus according to claim 1, further comprising:
   a vicinity pixel average value calculation portion to calculate an average value of pixel values of a plurality of pixels included in a vicinity region located in a vicinity of said noise region; and
   a vicinity pixel maximum value calculation portion to calculate a maximum value of pixel values of a plurality of pixels included in the vicinity region located in the vicinity of said noise region, wherein
   said substituting portion substitutes a pixel value of a pixel included in said noise region with the average value calculated by said vicinity pixel average value calculation portion or with the maximum value calculated by said vicinity pixel maximum value calculation portion if a region in a vicinity of said noise region is not included in the region of dots detected by said dot region detecting portion.

5. The image processing apparatus according to claim 4, further comprising an average value calculation portion to calculate an average value of pixel values of pixels included in a region which is in a vicinity of said noise region and which is larger than said vicinity region, wherein said substituting portion substitutes a pixel value of a pixel included in said noise region with the maximum value calculated by said vicinity pixel maximum value calculation portion if the average value calculated by said average value calculation portion is greater than a prescribed value, and substitutes a pixel value of a pixel included in said noise region with the average value calculated by said vicinity pixel average value calculation portion if the average value calculated by said average value calculation portion is not greater than the prescribed value, when a region in a vicinity of said noise region is not included in the region of dots detected by said dot region detecting portion.

6. An image processing apparatus, comprising:
an image data obtaining portion to obtain image data by scanning an original document;
a noise detecting portion to detect a noise from the obtained image data;
a dot region detecting portion to detect a region of dots from a vicinity of a noise region including the detected noise; and
a correction portion to substitute a pixel value of a pixel included in said noise region with one substitution candidate selected from a plurality of substitution candidates based on a detected result of said dot region detecting portion.

7. The image processing apparatus according to claim 6, wherein said correction portion includes
a first substituting portion to substitute a pixel value of a pixel included in said noise region with a pixel value of a pixel included in a substitution region that is located in a vicinity of said noise region and that is of a same size as said noise region, and
a selecting portion to enable said first substituting portion if a region of dots is detected from a vicinity of the noise region by said dot region detecting portion.

8. The image processing apparatus according to claim 7, wherein said first substituting portion includes a substitution region deciding portion to decide a distance between said noise region and said substitution region based on a size of a dot included in a detected region of dots if the region of dots is detected from the vicinity of said noise region by said dot region detecting portion.

9. The image processing apparatus according to claim 8, wherein said substitution region deciding portion includes
a binarization portion to binarize said obtained image data into a white-colored pixel and a black-colored pixel, and
said substitution region deciding portion decides a second pixel where the number of white-colored pixels and the number of black-colored pixels are equal among a plurality of pixels that continue successively in a main scanning direction having at one end a first pixel contacting said noise region on the substitution region side and at other end said second pixel which is included in said substitution region and which is located farthest away from said noise region, and where at least one of said second pixel and a third pixel contacting said second pixel on opposite side of said first pixel is of same color as said first pixel.

10. The image processing apparatus according to claim 6, further comprising an average value calculation portion to calculate an average value of pixel values of a plurality of pixels in a vicinity of said noise region, wherein said correction portion substitutes a pixel value of a pixel included in said noise region with one substitution candidate selected from a plurality of substitution candidates based on a detected result of said dot region detecting portion and on the average value calculated by said average value calculation portion.

11. The image processing apparatus according to claim 10, wherein said correction portion includes
a vicinity pixel average value calculation portion to calculate an average value of pixel values of a plurality of pixels included in a vicinity region located in a vicinity of said noise region,
a vicinity pixel maximum value calculation portion to calculate a maximum value of pixel values of the plurality of pixels included in said vicinity region located in the vicinity of said noise region,
a first substituting portion to substitute a pixel value of a pixel included in said noise region with a pixel value of a pixel included in a substitution region that is located in a vicinity of said noise region and that is of a same size as said noise region,
a second substituting portion to substitute a pixel value of a pixel included in said noise region with the average value calculated by said vicinity pixel average value calculation portion,
a third substituting portion to substitute a pixel value of a pixel included in said noise region with the maximum value calculated by said vicinity pixel maximum value calculation portion, and
a selecting portion to enable one of said first substituting portion, said second substituting portion, and said third substituting portion based on a detected result of said dot region detecting portion and on the average value calculated by said average value calculation portion.

12. The image processing apparatus according to claim 11, wherein said selecting portion enables said first substituting portion if a region of dots is detected from a vicinity of said noise region by said dot region detecting portion, enables said second substituting portion if the region of dots is not detected from the vicinity of said noise region by said dot region detecting portion and if the average value calculated by said average value calculation portion is not greater than a prescribed value, and enables said third substituting portion if the region of dots is not detected from the vicinity of said noise region by said dot region detecting portion and if the average value calculated by said average value calculation portion is greater than said prescribed value.

13. The image processing apparatus according to claim 11, wherein said first substituting portion includes a substitution region deciding portion to decide a distance between said noise region and said substitution region based on a size of a dot included in a detected region of dots if the region of dots is detected from the vicinity of said noise region by said dot region detecting portion.

14. The image processing apparatus according to claim 13, wherein said substitution region deciding portion includes
a binarization portion to binarize said obtained image data into a white-colored pixel and a black-colored pixel, and
said substitution region deciding portion decides a second pixel where the number of white-colored pixels and the number of black-colored pixels are equal among a plurality of pixels that continue successively in a main scanning direction and having at one end a first pixel contacting said noise region on the substitution region side and at other end said second pixel which is included in said substitution region and which is located farthest away from said noise region, and where at least one of said second pixel and a third pixel contacting said second pixel on opposite side of said first pixel is of same color as said first pixel.

15. An image processing method, comprising the steps of:
obtaining image data by scanning an original document;
detecting a noise from the obtained image data;
detecting a region of dots from said obtained image data; and
substituting a noise region with a substitution region that is located in a vicinity of said noise region and that is of a same size as said noise region if a region in a vicinity of said noise region including the noise detected in said step of detecting the noise is included in the region of dots detected in said step of detecting the region of dots.

16. The image processing method according to claim 15, wherein said substituting step includes a step of deciding a distance between said noise region and said substitution region based on a size of a dot in a region in a vicinity of said noise region if a region in a vicinity of said noise region including the noise detected in said step of detecting the noise is included in the region of dots detected in said step of detecting the region of dots.

17. The image processing method according to claim 15, further comprising the steps of:
calculating a first average value of pixel values of a plurality of pixels included in a vicinity region located in a vicinity of said noise region; and
calculating a maximum value of pixel values of a plurality of pixels included in the vicinity region located in the vicinity of said noise region, wherein
said substituting step includes a step of selecting one of said first average value and the maximum value calculated in said step of calculating the maximum value so as to substitute a pixel value of a pixel included in said noise region, if a region in a vicinity of said noise region is not included in the region of dots detected by said step of detecting the region of dots.

18. The image processing method according to claim 17, further comprising a step of calculating a second average value of pixel values of pixels included in a region which is in a vicinity of said noise region and which is larger than said vicinity region, wherein
said selecting step includes a step of selecting said maximum value if said second average value is greater than a prescribed value, and a step of selecting said first average value if said second average value is not greater than the prescribed value.

19. An image processing method, comprising the steps of:
obtaining image data by scanning an original document;
detecting a noise from the obtained image data;
detecting a region of dots from a vicinity of a noise region including the detected noise; and
substituting a pixel value of a pixel included in said noise region with one substitution candidate selected from a plurality of substitution candidates based on a detected result of said step of detecting the region of dots.

20. The image processing method according to claim 19, wherein said substituting step includes
a first substituting step of substituting a pixel value of a pixel included in said noise region with a pixel value of a pixel included in a substitution region that is located in a vicinity of said noise region and that is of a same size as said noise region, and
a step of enabling said first substituting step if a region of dots is detected from a vicinity of said noise region in said step of detecting the region of dots.

21. The image processing method according to claim 19, further comprising a step of calculating an average value of pixel values of a plurality of pixels in a vicinity of said noise region as an average value for determination, wherein
said substituting step includes a step of selecting one substitution candidate from a plurality of substitution candidates based on a detected result of said step of detecting the region of dots and on said average value for determination so as to substitute a pixel value of a pixel included in said noise region.

22. The image processing method according to claim 21, wherein said substituting step further includes
a step of calculating an average value of pixel values of a plurality of pixels included in a vicinity region located in a vicinity of said noise region as an average value for substitution,
a step of calculating a maximum value of pixel values of the plurality of pixels included in said vicinity region located in the vicinity of said noise region,
a first substituting step of substituting a pixel value of a pixel included in said noise region with a pixel value of a pixel included in a substitution region that is located in the vicinity of said noise region and that is of a same size as said noise region,
a second substituting step of substituting a pixel value of a pixel included in said noise region with said average value for substitution,
a third substituting step of substituting a pixel value of a pixel included in said noise region with the maximum value calculated in said step of calculating the maximum value, wherein
said selecting step includes a step of enabling one of said first substituting step, said second substituting step, and said third substituting step based on a detected result of said step of detecting the region of dots and on said average value for determination.

\* \* \* \* \*